United States Patent
Kawahara

(10) Patent No.: US 9,596,133 B2
(45) Date of Patent: Mar. 14, 2017

(54) PROCESS EXECUTION METHOD AND APPARATUS

(71) Applicant: FUJITSU LIMITED, Kawasaki-shi, Kanagawa (JP)

(72) Inventor: Ryuichi Kawahara, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 266 days.

(21) Appl. No.: 13/906,565

(22) Filed: May 31, 2013

(65) Prior Publication Data
US 2014/0006571 A1 Jan. 2, 2014

(30) Foreign Application Priority Data
Jul. 2, 2012 (JP) ................................ 2012-148950

(51) Int. Cl.
G06F 9/46 (2006.01)
H04L 12/24 (2006.01)
G06F 9/48 (2006.01)

(52) U.S. Cl.
CPC .......... H04L 41/0806 (2013.01); G06F 9/468 (2013.01); G06F 9/4843 (2013.01)

(58) Field of Classification Search
None
See application file for complete search history.

(56) References Cited

U.S. PATENT DOCUMENTS

| 6,078,982 A | 6/2000 | Du et al. |
| 6,868,471 B1 * | 3/2005 | Kota ................. 711/2 |
| 7,454,579 B1 * | 11/2008 | Ravan ............................ 711/151 |
| 7,716,489 B1 * | 5/2010 | Brandt et al. ................. 713/180 |
| 7,865,663 B1 * | 1/2011 | Nelson et al. ................ 711/112 |
| 8,099,509 B2 * | 1/2012 | Kawato ......................... 709/229 |
| 2002/0055849 A1 | 5/2002 | Georgakopoulos et al. |
| 2002/0162005 A1 * | 10/2002 | Ueda et al. ................... 713/182 |
| 2003/0163509 A1 * | 8/2003 | McKean et al. ............. 709/100 |
| 2004/0123294 A1 | 6/2004 | Fussell |
| 2004/0215780 A1 * | 10/2004 | Kawato ........................ 709/226 |
| 2005/0005074 A1 * | 1/2005 | Landin et al. ................ 711/148 |
| 2007/0168507 A1 * | 7/2007 | Das et al. ..................... 709/225 |

(Continued)

FOREIGN PATENT DOCUMENTS

| JP | 2006-163776 | 6/2006 |
| WO | WO 2006/082732 A1 | 8/2006 |

OTHER PUBLICATIONS

Extended European Search Report issued Jul. 27, 2016 in Patent Application No. 13173350.3.

*Primary Examiner* — Emerson Puente
*Assistant Examiner* — Mehran Kamran
(74) *Attorney, Agent, or Firm* — Oblon, McClelland, Maier & Neustadt, L.L.P.

(57) ABSTRACT

A disclosed method includes: specifying an activity to be executed, based on process definition that includes plural activities, and that includes a sequence of transitions between activities, wherein each activity includes information representing a device that is operated through a network; first determining, based on the sequence of the transitions, whether or not the specified activity is an initial operation for a certain device whose information is included in the specified activity; and obtaining an access right to the certain device, when determining that the specified activity is the initial operation for the certain device.

8 Claims, 30 Drawing Sheets

(56) References Cited

U.S. PATENT DOCUMENTS

| | | | |
|---|---|---|---|
| 2008/0072292 A1* | 3/2008 | Narjala | H04L 12/2807 726/4 |
| 2008/0313634 A1* | 12/2008 | Matsueda | 718/100 |
| 2009/0164649 A1* | 6/2009 | Kawato | 709/229 |
| 2010/0100655 A1* | 4/2010 | Dowedeit | 710/200 |
| 2010/0175065 A1* | 7/2010 | Uchida | 718/102 |
| 2010/0275218 A1* | 10/2010 | Young et al. | 719/320 |
| 2011/0231564 A1* | 9/2011 | Korsunsky et al. | 709/231 |
| 2012/0054355 A1* | 3/2012 | Arrasvuori et al. | 709/229 |
| 2013/0244684 A1* | 9/2013 | Kadous et al. | 455/456.1 |
| 2013/0246639 A1* | 9/2013 | Nedbal et al. | 709/228 |

* cited by examiner

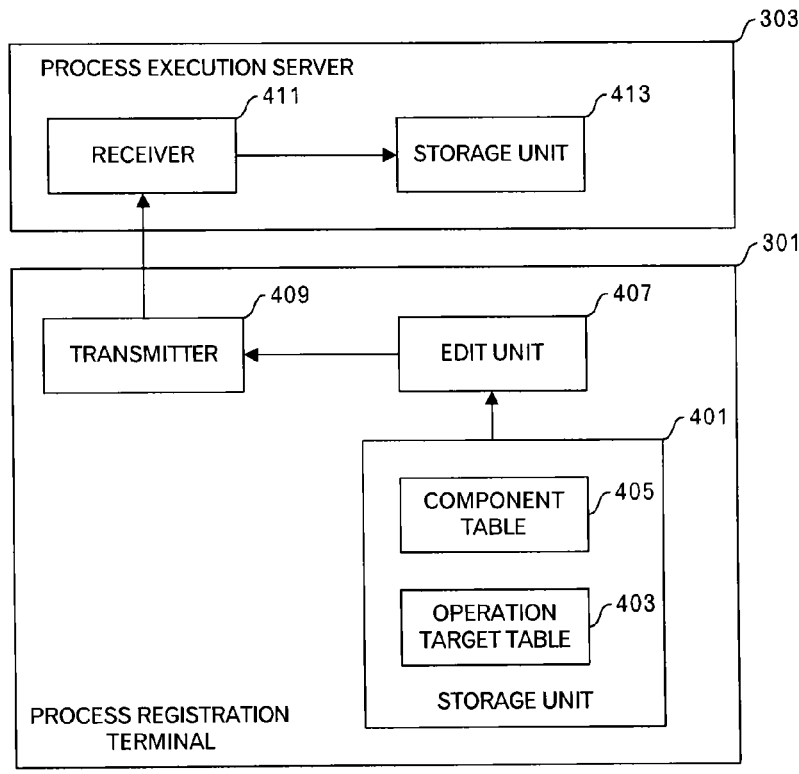

FIG.4

| COMPONENT ID | OPERATION CONTENTS (COMPONENT NAME) | TYPE OF OPERATION TARGET | COMPONENT ATTRIBUTE |
|---|---|---|---|
| P1 | ACTIVATE VIRTUAL MACHINE | SERVER | EXCLUSIVE TYPE |
| P2 | STOP VIRTUAL MACHINE | SERVER | EXCLUSIVE TYPE |
| P3 | CHANGE SETTING OF VIRTUAL MACHINE | SERVER | EXCLUSIVE TYPE |
| P4 | OBTAIN SERVER INFO. | SERVER | SHARED TYPE |
| P5 | OUTPUT FILE | SERVER | SHARED TYPE |
| P6 | SEND MAIL | NO OPERATION TARGET | NO EXCLUSION |
| P7 | DELETE FILE | SERVER | SHARED TYPE |
| P8 | SEND MAIL WITH FILE | NO OPERATION TARGET | NO EXCLUSION |

FIG.5

| DEVICE NAME | DEVICE TYPE | MANAGER NAME | NECESSITY OF AUTHORIZATION |
|---|---|---|---|
| SERVER A | SERVER | USER A | NECESSARY |
| SERVER B | SERVER | USER B | UNNECESSARY |
| SERVER C | SERVER | USER B | UNNECESSARY |
| NODE A | NODE | USER A | UNNECESSARY |
| NODE B | NODE | USER B | UNNECESSARY |

| ACTIVITY NO. | COMPONENT ID | OPERATION TARGET | TRANSITION CONDITION | ACTIVITY NO. OF TRANSITION DESTINATION |
|---|---|---|---|---|
| A1 | P2 | SERVER A | SUCCESS | A2 |
| | | | FAILURE | A9 |
| A2 | P3 | SERVER A | SUCCESS & NECESSARY TO ACTIVATE | A3 |
| | | | SUCCESS & UNNECESSARY TO ACTIVATE | A4 |
| | | | FAILURE | A9 |
| A3 | P1 | SERVER A | SUCCESS | A4 |
| | | | FAILURE | A9 |
| A4 | P4 | SERVER A | WITH INFO. | A5 |
| | | | WITHOUT INFO. | A8 |
| A5 | P5 | SERVER A | WITH OUTPUT | A6 |
| | | | WITHOUT OUTPUT | A8 |
| A6 | P8 | NONE | NONE | A7 |
| A7 | P7 | SERVER A | NONE | E |
| A8 | P6 | NONE | NONE | E |
| A9 | P6 | NONE | NONE | E |

FIG.13

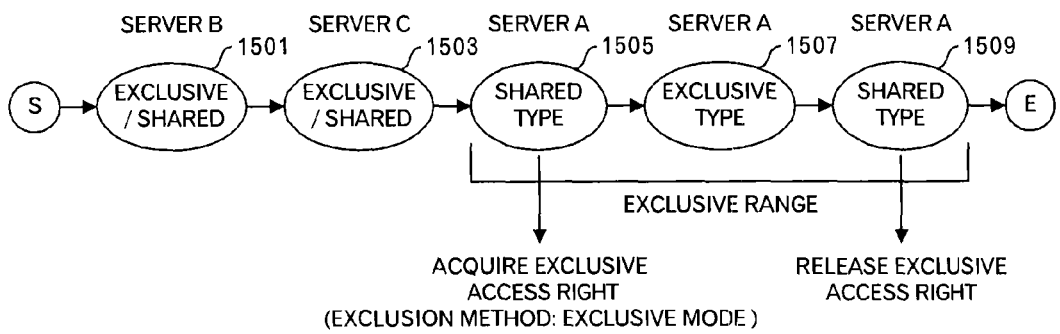

FIG.15

| FIRST TRANSITION ROUTE | A1 | A9 | E | | | | |
|---|---|---|---|---|---|---|---|
| SECOND TRANSITION ROUTE | A1 | A2 | A9 | E | | | |
| THIRD TRANSITION ROUTE | A1 | A2 | A3 | A9 | E | | |
| FOURTH TRANSITION ROUTE | A1 | A2 | A3 | A4 | A8 | E | |
| FIFTH TRANSITION ROUTE | A1 | A2 | A3 | A4 | A5 | A8 | E |
| SIXTH TRANSITION ROUTE | A1 | A2 | A3 | A4 | A5 | A6 | A7 | E |
| SEVENTH TRANSITION ROUTE | A1 | A2 | A4 | A8 | E | | |
| EIGHTH TRANSITION ROUTE | A1 | A2 | A4 | A5 | A8 | E | |
| NINTH TRANSITION ROUTE | A1 | A2 | A4 | A5 | A6 | A7 | E |

FIG.24

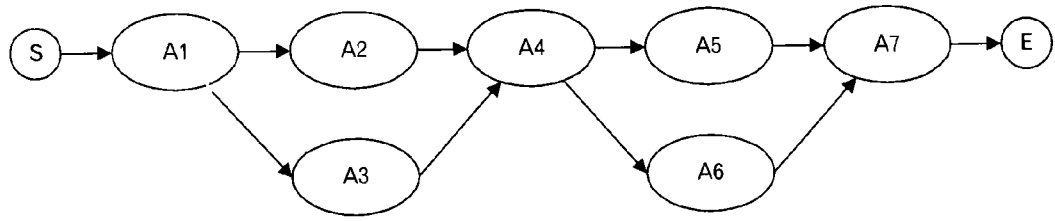

FIG.25

| FIRST TRANSITION ROUTE | A1 | A2 | A4 | A5 | A7 | E |
|---|---|---|---|---|---|---|
| SECOND TRANSITION ROUTE | A1 | A2 | A4 | A6 | A7 | E |
| THIRD TRANSITION ROUTE | A1 | A3 | A4 | A5 | A7 | E |
| FOURTH TRANSITION ROUTE | A1 | A3 | A4 | A6 | A7 | E |

| | | | | | | | | | | |
|---|---|---|---|---|---|---|---|---|---|---|
| FIRST TRANSITION ROUTE | SERVER A: EXCLUSIVE | E | | | | | | | | |
| SECOND TRANSITION ROUTE | SERVER A: EXCLUSIVE | NO OPERATION TARGET | | | | | | | | |
| THIRD TRANSITION ROUTE | SERVER A: EXCLUSIVE | SERVER A: EXCLUSIVE | E | | | | | | | |
| FOURTH TRANSITION ROUTE | SERVER A: EXCLUSIVE | SERVER A: EXCLUSIVE | SERVER A: SHARED | NO OPERATION TARGET | | | | | | |
| FIFTH TRANSITION ROUTE | SERVER A: EXCLUSIVE | SERVER A: EXCLUSIVE | SERVER A: SHARED | SERVER A: SHARED | E | | | | | |
| SIXTH TRANSITION ROUTE | SERVER A: EXCLUSIVE | SERVER A: EXCLUSIVE | SERVER A: SHARED | SERVER A: SHARED | SERVER A: SHARED | NO OPERATION TARGET | | | | |
| SEVENTH TRANSITION ROUTE | SERVER A: EXCLUSIVE | SERVER A: EXCLUSIVE | NO OPERATION TARGET | NO OPERATION TARGET | NO OPERATION TARGET | E | | | | |
| EIGHTH TRANSITION ROUTE | SERVER A: EXCLUSIVE | SERVER A: SHARED | SERVER A: SHARED | SERVER A: SHARED | SERVER A: SHARED | E | | | | |
| NINTH TRANSITION ROUTE | SERVER A: EXCLUSIVE | SERVER A: SHARED | SERVER A: SHARED | NO OPERATION TARGET | SERVER A: SHARED | E | | | | |

| ACTIVITY NO. | COMPONENT ID | OPERATION TARGET | TRANSITION CONDITION | ACTIVITY NO. OF TRANSITION DESTINATION |
|---|---|---|---|---|
| A1 | P10 | NONE | NONE | A2 |
| A2 | P2 | SERVER S | SUCCESS | A3 |
| A2 | P2 | SERVER S | FAILURE | A6 |
| A3 | P2 | SERVER T | SUCCESS | A4 |
| A3 | P2 | SERVER T | FAILURE | A6 |
| A4 | P2 | SERVER U | SUCCESS | A5 |
| A4 | P2 | SERVER U | FAILURE | A6 |
| A5 | P6 | NONE | NONE | E |
| A6 | P6 | NONE | NONE | E |

FIG.53

| FIRST TRANSITION ROUTE | A1 | A2 | A6 | E | | |
|---|---|---|---|---|---|---|
| SECOND TRANSITION ROUTE | A1 | A2 | A3 | A6 | E | |
| THIRD TRANSITION ROUTE | A1 | A2 | A3 | A4 | A6 | E |
| FOURTH TRANSITION ROUTE | A1 | A2 | A3 | A4 | A5 | E |

FIG.54

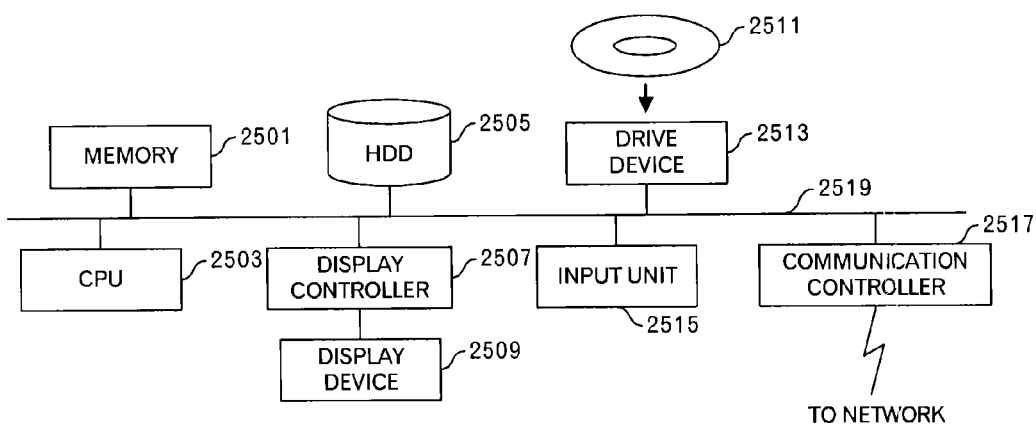

FIG.56

| | | | | |
|---|---|---|---|---|
| FIRST TRANSITION ROUTE | NO OPERATION TARGET | SERVER S: EXCLUSIVE | NO OPERATION TARGET | | |
| SECOND TRANSITION ROUTE | NO OPERATION TARGET | SERVER S: EXCLUSIVE | SERVER T: EXCLUSIVE | E | |
| THIRD TRANSITION ROUTE | NO OPERATION TARGET | SERVER S: EXCLUSIVE | SERVER T: EXCLUSIVE | SERVER U: EXCLUSIVE | NO OPERATION TARGET | E |
| FOURTH TRANSITION ROUTE | NO OPERATION TARGET | SERVER S: EXCLUSIVE | SERVER T: EXCLUSIVE | SERVER U: EXCLUSIVE | NO OPERATION TARGET | E |

FIG.55

PROCESS EXECUTION METHOD AND APPARATUS

CROSS-REFERENCE TO RELATED APPLICATIONS

This application is based upon and claims the benefit of priority of the prior Japanese Patent Application No. 2012-148950, filed on Jul. 2, 2012, the entire contents of which are incorporated herein by reference.

FIELD

This invention relates to a technique for performing an operational process for operating a computer.

BACKGROUND

In a data center, in order to automatically manage a server or node apparatus that is an apparatus to be operated, there is a technique for executing an operational process by a process execution server. The operational process is defined by a flow of activities for operating a system to be operated. The designer of the operational process uses components that are programs for performing an operational processing to generate an operational process by setting a flow of the activities.

In case where a system to be operated is managed by executing each of plural operational processes, for which a flow of activities is individually defined as described above, when a common apparatus to be operated is operated by plural operational processes, there is a case where results cannot be obtained as assumed.

An example is illustrated in FIG. 1 where an interrupt occurs among the operational processes. An upper operational process includes a flow of activities 101 to 105 so as to boot up a server, activate a service X in the server and further activate a service Y in the server. On the other hand, a lower operational process includes a flow of activities 107 and 109 so as to change a network setting in the same server and reboot the server.

When operations for the same server are executed in parallel by different operational processes, as illustrated in FIG. 1, an operation by one operational process may interrupt an operation by the other operational process. The upper operational process activates the service Y on the premise that the service X is operating. However, when the operation of the activity 109 for rebooting the server in the lower operational process is executed between the operation of the activity 103 for activating the service X and the operation of the activity 105 for activating the service Y, the service Y is activated in a state where the service X is not operating. Accordingly, the service Y does not normally operate.

Moreover, in addition to the aforementioned interaction among plural operational processes, there is also a problem concerning the human judgment at the operation. FIG. 2 illustrates an example of an operational process including an authorization. This operational process includes definition of a flow including activities 201 to 205 so that an authorization request is issued to a manager, and when the response to the request represents grant, the setting of the network in the server is changed, then the server is rebooted. On the other hand, when the response represents denial, the process is suspended. By setting the operational process so as to obtain the judgment by the manager at any time, the operation is appropriately carried out according to the status.

However, when the human judgment is frequently requested in the operation, the effectiveness of the automatic operation is lowered. Therefore, as for the setting of the activity 201 relating to the authorization request, both of the safety and effectiveness are considered. Presumptively, in the example of FIG. 2, when the setting change 203 of the network and the reboot 205 of the server impair the safety, it is presumed that the authorization request is omitted. Thus, the execution of the operational process to operate the computer is difficult.

SUMMARY

As one aspect, a process execution method includes: (A) specifying an activity to be executed, based on process definition that includes plural activities, and that includes a sequence of transitions between activities, wherein each activity includes information representing a device that is operated through a network; (B) first determining, based on the sequence of the transitions, whether or not the specified activity is an initial operation for a certain device whose information is included in the specified activity; and (C) obtaining an access right to the certain device, when determining that the specified activity is the initial operation for the certain device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram depicting configuration examples of a process registration terminal and process execution server, which relate to registration of the operational process;

FIG. 5 is a diagram depicting an example of a component table;

FIG. 13 is a diagram depicting an example of process definition;

FIG. 15 is a diagram depicting examples of transitions in which an exclusive access right is obtained and released;

FIG. 24 is a diagram depicting an example of a transition route table;

FIG. 25 is a diagram depicting a model of the operational process;

FIG. 26 is a diagram depicting a model of the transition route table;

FIG. 50 is a diagram depicting an example of the exclusive range for each transition route;

FIG. 53 is a diagram depicting an example of process definition relating to the second embodiment;

FIG. 54 is a diagram depicting an example of transition routes relating to the second embodiment;

FIG. 55 is a diagram depicting an example of the exclusive range for each transition route relating to the second embodiment; and FIG. 56 is a diagram depicting a configuration example of a computer.

DESCRIPTION OF EMBODIMENTS

Embodiment 1

Figure 1:
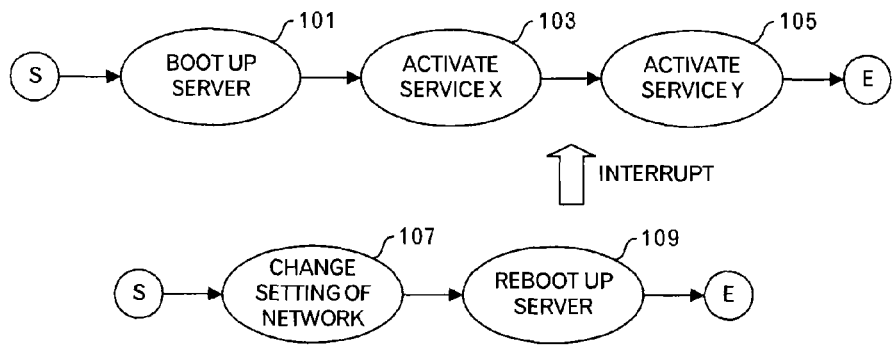
FIG. 1 is a diagram illustrating an example of an interruption among operational processes.
Figure 2:
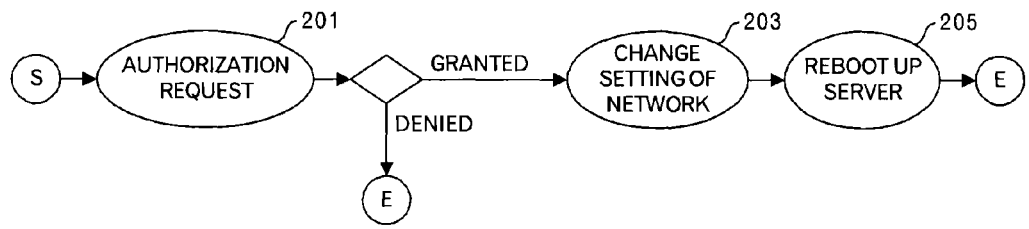
FIG. 2 is a diagram depicting an example of an operational process including an authorization.
Figure 3:
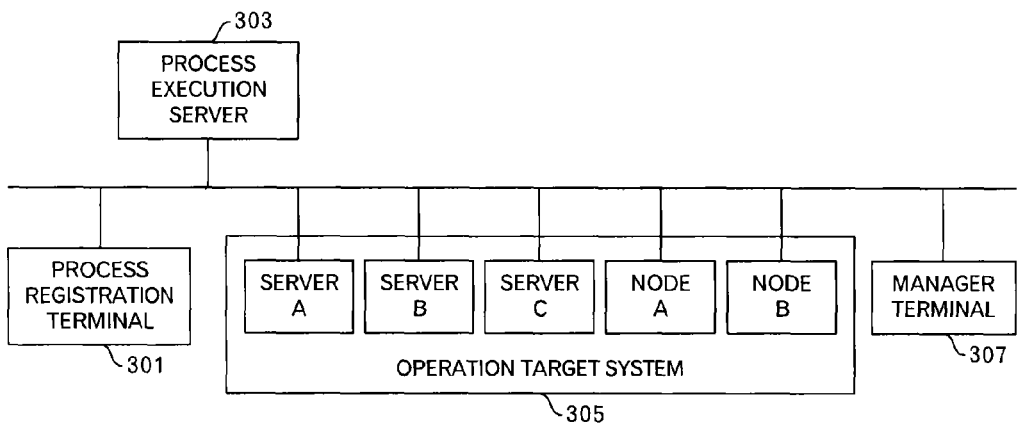
FIG. 3 is a diagram depicting a configuration example of a system used for an automatic operational process.

FIG. 3 illustrates a configuration example of a system using the automatic operational processes. The process registration terminal 301 is connected through a network with a process execution server 303. The process registration terminal 301 is a terminal used by a designer to generate and register operational processes. The process execution server 303 is a server to execute the registered operational processes.

Furthermore, the process execution server 303 is connected through the network with an operation target system 305 and a manager terminal 307. The operation target system 305 is a system operated by the operational processes. The operation target system 305 includes one or plural devices to be operated. The devices to be operated include a server or node device, for example. In an example of FIG. 3, the operation target system 305 includes a server A, server B, server C, node A and node B.

The manager terminal 307 is a terminal used by a manager who manages devices to be operated.

The network connecting the process registration terminal 301 and the process execution server 303 may be different from the network connecting the process registration terminal 301, the operation target system 305 and the manager terminal 307 or may be the same as the latter network.

Hereinafter, the registration of the operational process will be explained. FIG. 4 illustrates configuration examples of the process registration terminal 301 and the process execution server 303, which are related to the registration of the operational process. The process registration terminal 301 has a storage unit 401, an edit unit 407 and a transmitter 409. The storage unit 401 stores information used to generate the operational process. The storage unit 401 stores an operation target table 403 and a component table 405.

The operation target table 403 is a table to manage devices to be operated, which are included in the operation target system 305. The component table 405 is a table to manage components that are programs, which process operations for the devices to be operated. The edit unit 407 is configured to generate the operational processes. The transmitter 409 is configured to transmit the generated operational process to the process execution server 303.

The process execution server 303 has a receiver 411 and a storage unit 413. The receiver 411 is configured to receive the operational process transferred to this server. The storage unit 413 is configured to store the received operational process.

FIG. 5 illustrates an example of the component table 405. The component table 405 includes a record for each component. The record includes items concerning a component identifier (ID), operation contents (e.g. component name), type of the operation target and component attribute. The component ID is identification information of the component. The operation contents represent contents of the operation executed by this component for the device. In this example, this item is also used for the component name. The type of the operation target represents a type of device to be operated by this component. However, when there is no target device for the operation such as the mail transmission, no operation target is set. The component attribute illustrates an exclusion method that is appropriate for the operation executed by this component. In case where there is a component to be operated, the component attribute is a "exclusive type" or "shared type", and in case where there is no component to be operated, the attribute is "exclusion unnecessary".

In an example of FIG. 5, a component whose component ID is P1 is a program to perform an operation that includes booting a virtual machine in a state where a device whose type is a server is exclusively possessed. Moreover, a component whose component ID is P6 is a program to transmit mail without any device to be operated, in other words, without carrying out any operation to a server or node.

Figures 6, 7:
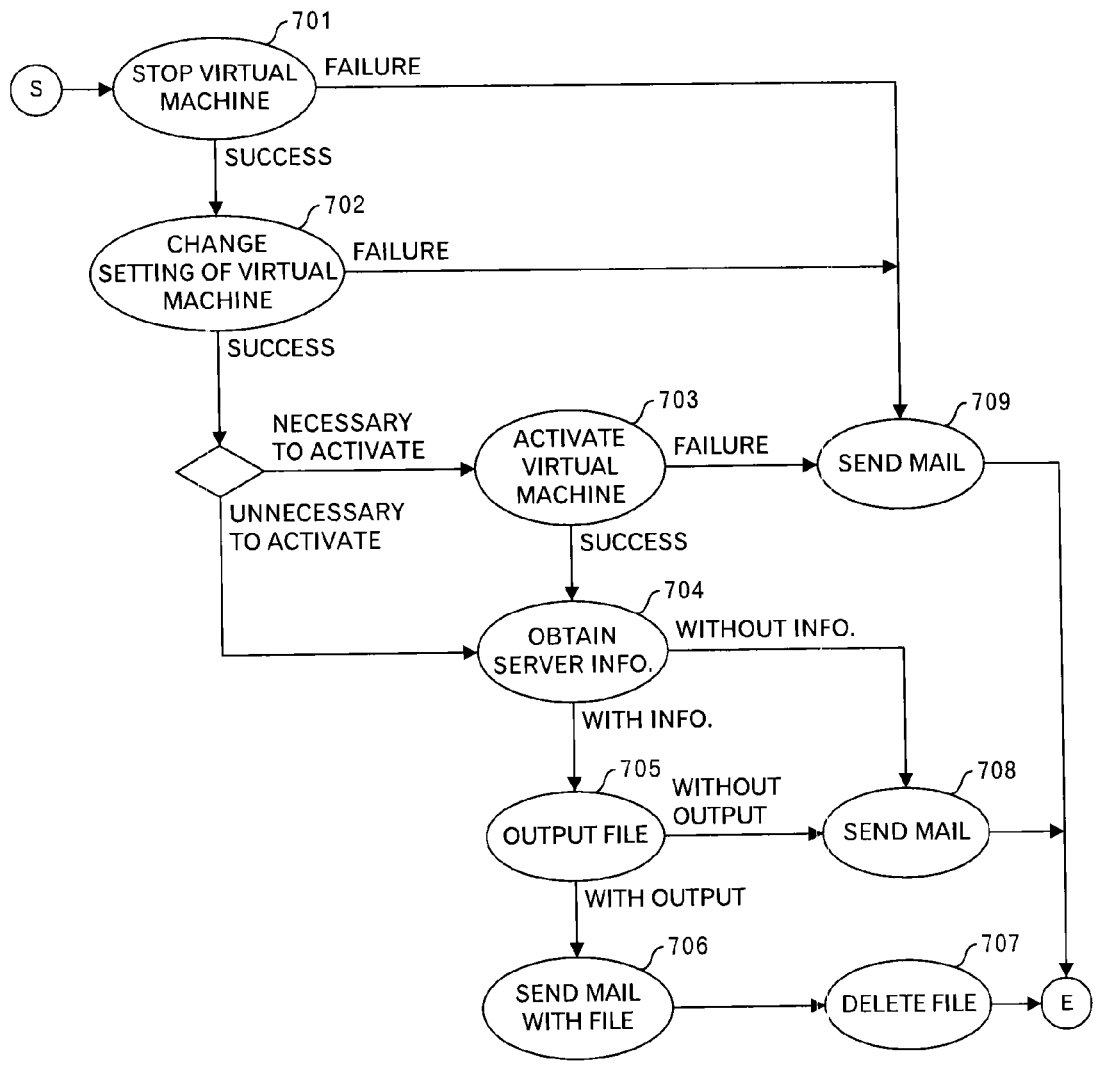
FIG. 6 is a diagram depicting an example of an operation target table.
FIG. 7 is a diagram depicting an example of an operational process.

FIG. 6 illustrates an example of the operation target table 403. The operation target table 403 includes a record for each device to be operated. The record includes items for a device name, device type, manager name and whether or not the authorization is required. The device name is a name to specify the device. The device type is a type of the device. In this example, this item represents whether this device is a server or node. The manager name is a name of a manager who has an authority to authorize the operations for the device. Whether the authorization is required represents whether or not the authorization for the operation against the device is required.

FIG. 7 illustrates an example of the generated operational process. This figure schematically depicts an operational process generated by the edit unit 407. This operational process includes activities 701 to 709. The arrow represents a transitional flow. Moreover, in case where the transition includes a branch, the branch condition is displayed.

For example, when the execution result of the activity 701 for stopping the virtual machine represents success, the operation is shifted to an execution of the activity 702 for changing the setting of the virtual machine, and when the execution result of the activity 701 represents failure, the operation is shifted to an execution of the activity 709 for sending mail. The activity 709 intends to transmit the mail notifying an error. When the execution result of the activity 702 for changing the setting of the virtual machine represents success, and the status represents reboot is necessary, the operation is shifted to an execution of the activity 703 for booting the virtual machine, and when the execution result of the activity 702 for changing the setting of the virtual machine represents success, and the status represents that reboot is unnecessary, the operation is shifted to an execution of the activity 704 for obtaining server information. Moreover, when the execution result of the activity 702 for changing the setting of the virtual machine represents failure, the operation is shifted to the execution of the activity 709 for sending the mail. As for other activities, depending on the execution results, the transition destination is branched off. However, like the activity 706 for sending mail with a file, no branch may occur.

The file output in the activity 705 is intended to output, as a file, information obtained from the server in the activity 704. The activity 708 is intended to send mail notifying the completion without attaching any file. The activity 706 is intended to send mail notifying the completion with a file outputted in the activity 705. The activity 707 is intended to delete a file in the server.

Figure 8:
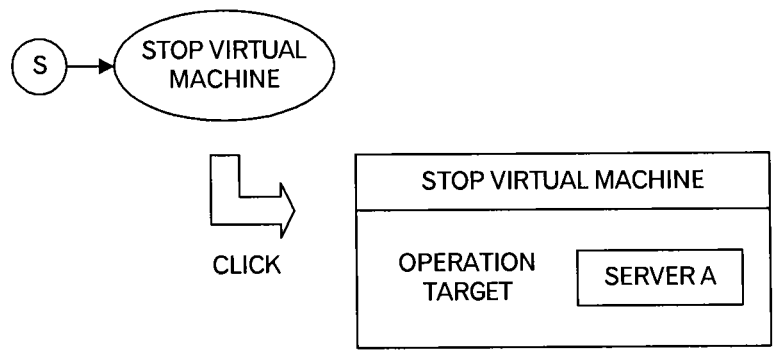
FIG. 8 is a diagram depicting an example of a window to set operation targets.

Moreover, a device to be operated is set for the activity. FIG. 8 illustrates an example of a window to set the operation target. For example, by clicking the activity, the window is displayed. This window is configured to accept a device to be operated. The window may display candidates for devices to be operated, and causes the designer to select any device among the candidates.

Figure 9:
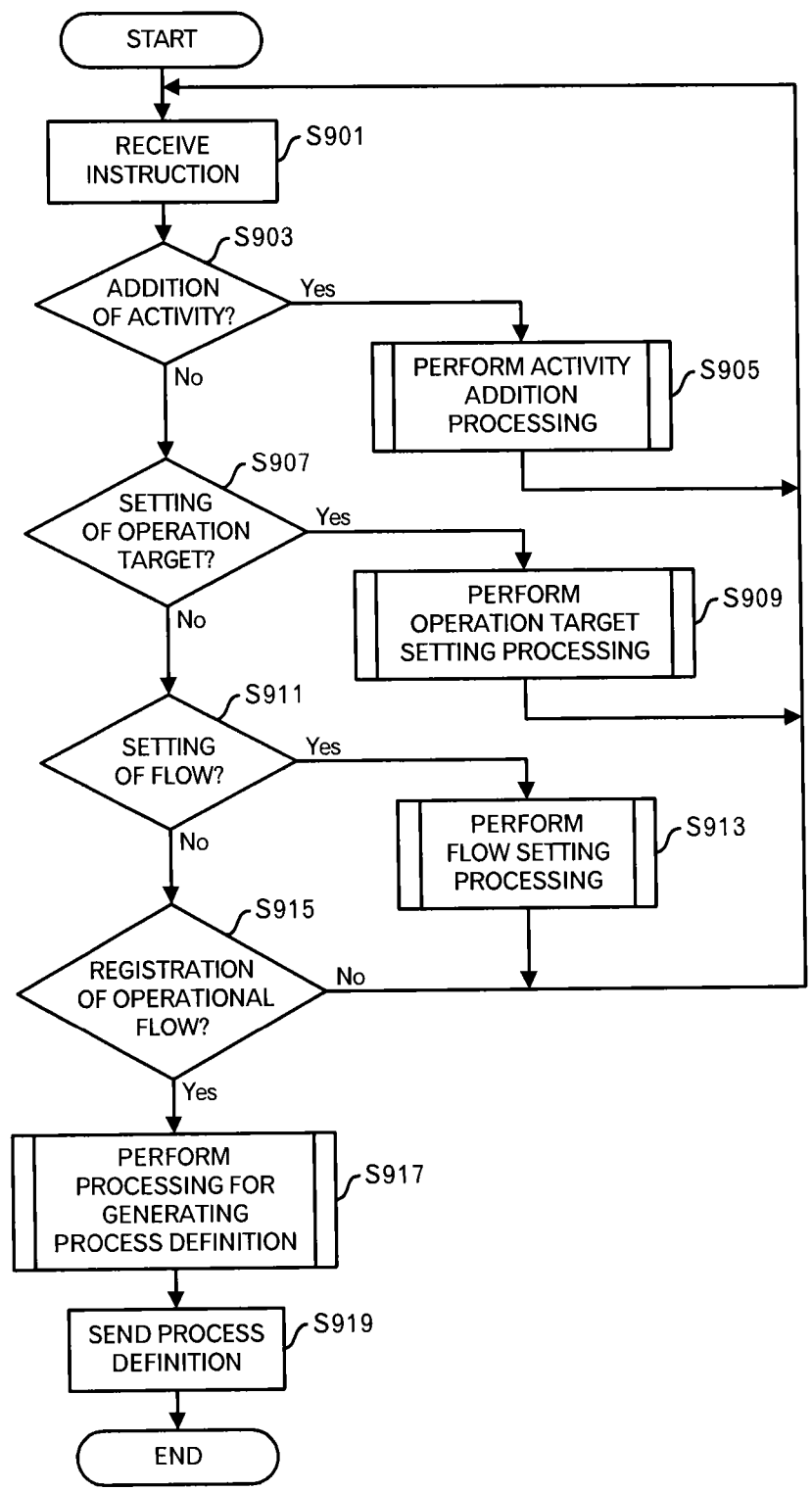
FIG. 9 is a diagram depicting a flow example of a processing for registering an operational process.

The edit unit 407 adds an activity, sets an operation target, sets a flow and generates an operational process in response to an instruction from the designer. FIG. 9 illustrates an example of a processing flow for registering the operational process. The edit unit 407 operates to accept an instruction from the designer (S901). The edit unit 407 may display candidates of instructions as a menu to make the designer select any instruction from the menu. The edit unit 407 determines whether or not the instruction accepted from the designer is addition of the activity (S903). When it is determined that the accepted instruction is addition of the activity, the edit unit 407 performs an activity addition processing (S905).

Figure 10:
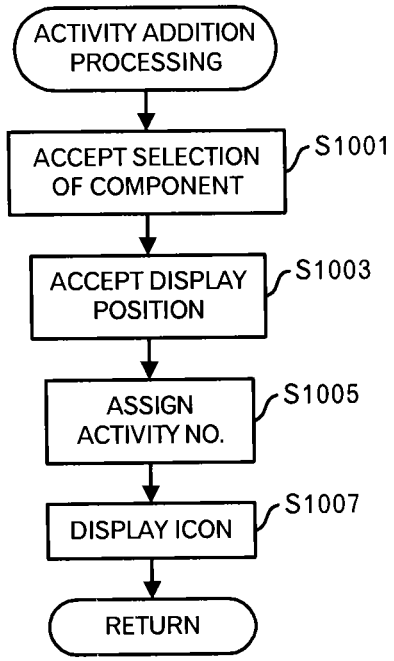
FIG. 10 is a diagram depicting a flow example of an activity addition processing.

FIG. 10 illustrates an example of a processing flow of the activity addition processing. The edit unit 407 accepts selection of a component (S1001). For example, the edit unit 407 displays component names included in the component table 405 as candidates, and makes the designer select a component. Next, the edit unit 407 accepts a display position (S1003). For example, the edit unit 407 accepts the display position by clicking. The edit unit 407 assigns an activity number to the activity (S1005). For example, the edit unit 407 assigns an activity number in order of the addition. The edit unit 407 displays an icon for the activity at the display position received from the designer (S1007). Furthermore, the edit unit 407 displays the component name within the icon.

Returning to S903 in FIG. 9, when it is determined that the accepted instruction is not addition of the activity, the edit unit 407 determines whether or not the instruction received from the designer is setting of the operation target (S907). When it is determined that the received instruction is setting of the operation target, the edit unit 407 performs an operation target setting processing (S909).

Figure 11:
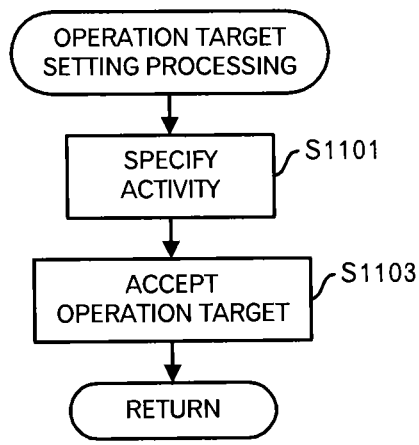
FIG. 11 is a diagram depicting a flow example of an operation target setting processing.

FIG. 11 illustrates an example of a processing flow of the operation target setting processing. The edit unit 407 identifies an activity for which the operation target is to be set (S1101). For example, when an icon of the activity is clicked, a window as illustrated in FIG. 8 is displayed. The edit unit 407 accepts a device of the operation target in that window (S1103). For example, devices whose type matches the type of the operation target, which is defined for the specified activity, are displayed as candidates from among devices included in the operation target table 403 to make the designer select a device among the candidate devices.

Returning to S907 in FIG. 9, when it is determined that the received instruction is not setting of the operation target, the edit unit 407 determines whether or not the instruction received from the designer is setting of a flow (S911). When it is determined that the received instruction is setting of the flow, the edit unit 407 performs a flow setting processing (S913).

Figure 12:
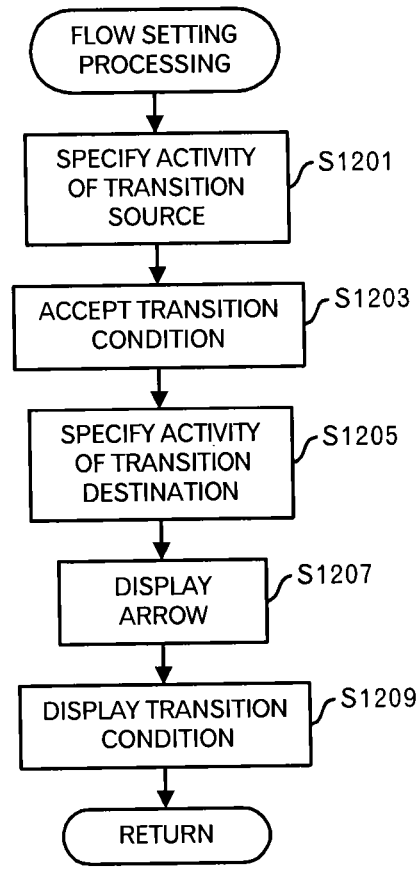
FIG. 12 is a diagram depicting a flow example of a flow setting processing.

FIG. 12 illustrates a flow example of the flow setting processing. The edit unit 407 identifies an activity of the transition source (S1201). The edit unit 407 identifies the activity of the transition source, when an icon of the activity is clicked, for example. Next, the edit unit 407 accepts a transition condition (S1203). Candidates of the transition conditions may be predetermined according to the operation contents of the component of the activity, and the edit unit 407 may cause the designer to select a transition condition among the candidates. The edit unit 407 identifies an activity of the transition destination (S1205). The edit unit 407 identifies the activity of the transition destination, when an icon of the activity is clicked, for example. The edit unit 407 displays an arrow from the activity of the transition source to the activity of the transition destination (S1207). The edit unit 407 displays the transition condition near the arrow, in case where the transition condition is received (S1209).

Returning to S911 in FIG. 9, when it is determined that the received instruction is not setting of the flow, the edit unit 407 determines whether or not the received instruction is registration of the operational process (S915). When it is determined that the received instruction is registration of the operational process, the edit unit 407 performs a processing for generating process definition (S917). When it is determined that the received instruction is not registration of the operational process, the processing returns to S901, and the processing from S903 to S915 is repeated.

Here, a configuration of the process definition to be registered will be explained. FIG. 13 illustrates an example of the process definition. The process definition includes a record for each activity. The record includes items concerning an activity number, component ID, operation target, transition condition and activity number of the transition destination. The activity number is information to specify the activity within the operational process. The component ID represents a component that performs a processing in the activity. The operation target represents a device operated by the component. The operation target is a parameter used when executing the program that is the component. The transition condition represents a condition that the transition occurs. The activity number of the transition destination represents an activity of the transition destination.

The process definition may include a component attribute corresponding to the component ID in addition to those items. Moreover, the process definition may include a manager name corresponding to the operation target and necessity of the authorization.

Figure 14:
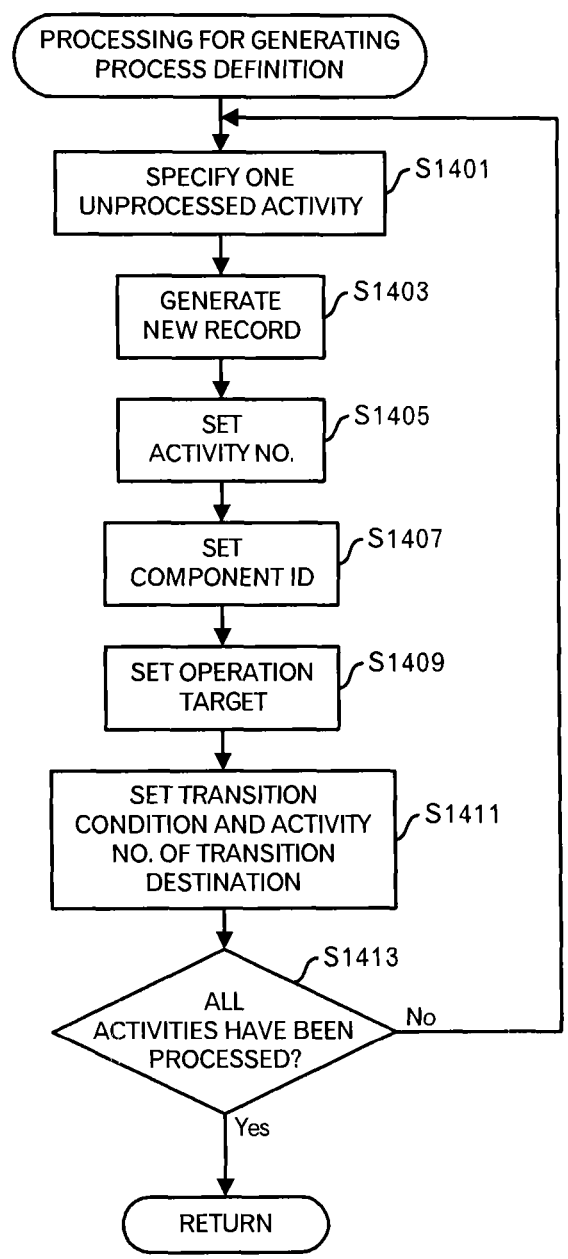
FIG. 14 is a diagram depicting a flow example of a process definition generation processing.

FIG. 14 illustrates a flow example of the processing for generating the process definition. The edit unit 407 identifies an unprocessed added activity (S1401). The edit unit 407 firstly generates a new record (S1403). The edit unit 407 sets the activity number assigned at S1005 in the record (S1405). The edit unit 407 sets an ID of the component designated at S1001 (S1407). The edit unit 407 may set the component attribute corresponding to the component ID in the record. The edit unit 407 sets the operation target designated at S1103 in the record (S1409). The edit unit 407 may set the manager name corresponding to the operation target and necessity of the authorization in the record. The edit unit 407 sets the transition condition designated at S1203 and the activity number of the transition destination, which was specified at S1205 (S1411). When there are plural combinations of the transition condition and the activity number of the transition destination, the edit unit 407 sets those combinations in the record. The edit unit 407 determines whether or not all of the activities have been processed (S1413). When it is determined that there is an unprocessed activity, the processing returns to S1401, and the processing from S1403 to S1411 is repeated. When it is determined that all of the activities have been processed, the processing returns to S919 in FIG. 9.

Returning to the explanation of the processing in FIG. 9, the transmitter 409 transmits the process definition to the process execution server 303 (S919).

The receiver 411 of the process execution server 303 receives the process definition, and stores the received process definition in the storage unit 413. The storage unit 413 is configured to store plural operational processes. The explanation of the operational process registration is completed.

Next, the execution of the operational process will be explained. The process execution server 303 is configured to simultaneously execute plural operational processes.

Before the explanation of the processing, an outline of obtaining and releasing an exclusive access right, which are caused by the execution of the operational process, will be explained. FIG. 15 illustrates an example of transitions for obtaining and releasing the exclusive access right. The flow from a start terminal S to an end terminal E through the activities 1501 to 1509 represents a transition route. In this figure, for convenience of the explanation, the component attribute of the activity is illustrated instead of the component name. Moreover, in this figure, the notation of "exclusive/shared" means the exclusive mode or shared mode. The exclusive range is a range for which operations are performed to the same operation target. The exclusive range for a certain device starts from the initial operation for that device in the operational process. In this example, the exclusive range for a server A is illustrated. The exclusive range for the server A starts from the activity 1505 and ends at the activity 1509. The process execution server 303 obtains the exclusive access right before the execution of the activity 1505, which is the beginning of the exclusive range, and releases the exclusive access right after the execution of the activity 1509, which is the end of the exclusive range. Moreover, the component attribute of the component, which is executed at the activity within the exclusive range, is an exclusive type or shared type. When the exclusive type is included as the component attribute of the activity within the exclusive range in this example, the exclusion method becomes the exclusive mode. In order to secure the exclusive state for a portion of the operations, the exclusive access right is obtained as a whole with the exclusive mode.

Figure 16:
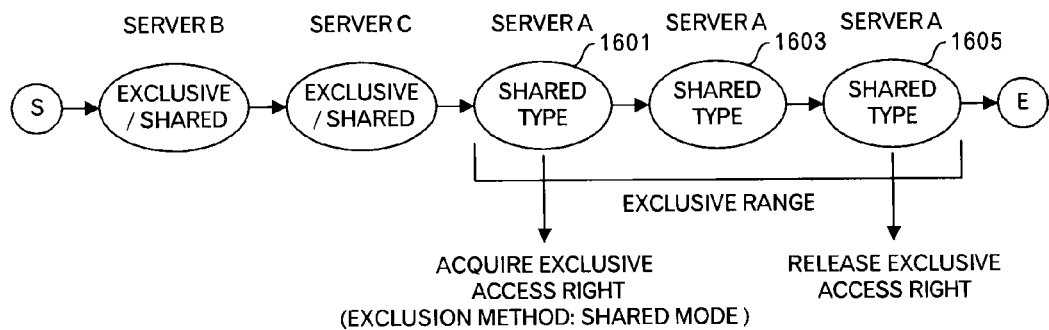
FIG. 16 is a diagram depicting examples of transitions in which an exclusive access right is obtained and released.

When only shared type is included as the component attributes of the activities within the exclusive range and no exclusive type is included as illustrated in FIG. 16, the shared mode is used as the exclusion method. When there is no operation that presumes the exclusive state, the exclusive access right with the shared mode is obtained, entirely.

Figure 17:
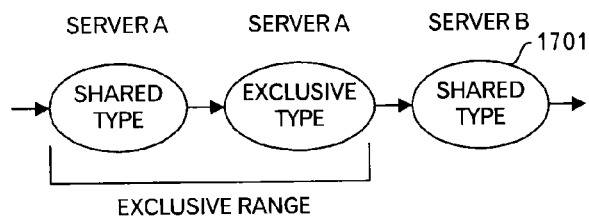
FIG. 17 is a diagram depicting an example of an exclusive range.

As illustrated in FIG. 17, when the next activity operates another operation target, the exclusive range ends before that activity.

Figure 18:
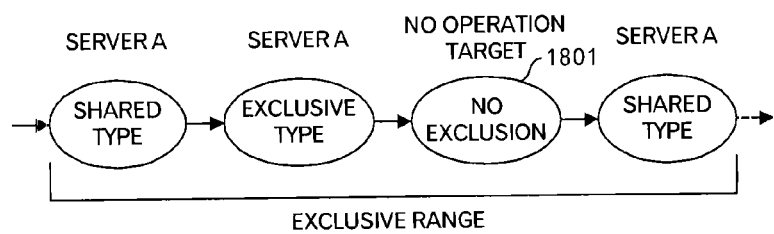
FIG. 18 is a diagram depicting an example of the exclusive range.

Moreover, when any activity having no operation target is sandwiched as illustrated in FIG. 18, the exclusive range may continue. For example, during a series of operations to the operation target, the activity having no operation target such as sending mail may be included.

Figure 19:
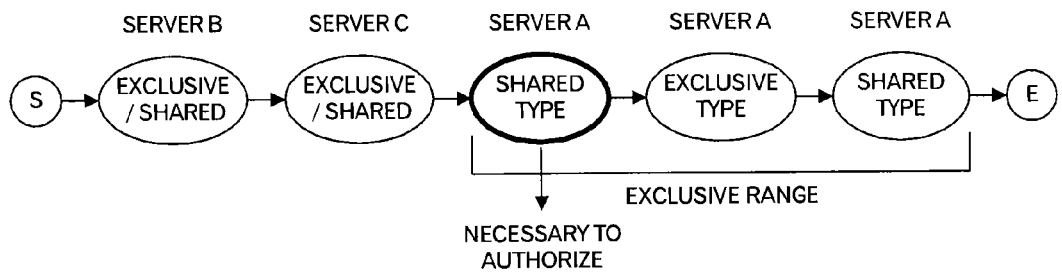
FIG. 19 is a diagram depicting an example of a transition with an authorization.

Next, an outline of determining necessity of the authorization will be explained. The process execution server 303 determines whether or not the authorization is necessary at the activity, which is the first activity in the exclusive range. At that time, the process execution server 303 determines whether or not the authorization is necessary, based on the attribute of the device, which is operated in the exclusive range. As illustrated in FIG. 6, the operation target table 403 holds the necessity of the authorization as the attribute of the device. Because the authorization is required for the server A, the process execution server 303 performs a procedure for the authorization at the beginning of the exclusive range, in which the server A is operated, as illustrated in FIG. 19. Especially, when the exclusive type is included as the component attribute of the activity within the exclusive range, the procedure for the authorization is conducted.

Figure 20:
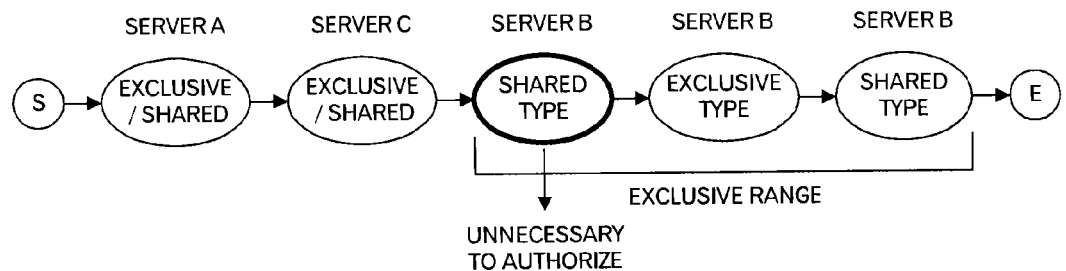
FIG. 20 is a diagram depicting an example of a transition without any authorization.

For example, because the authorization is not required for the server B, the process execution server 303 does not perform the procedure for the authorization for the exclusive range, in which the server B is operated, as illustrated in FIG. 20.

Figure 21:
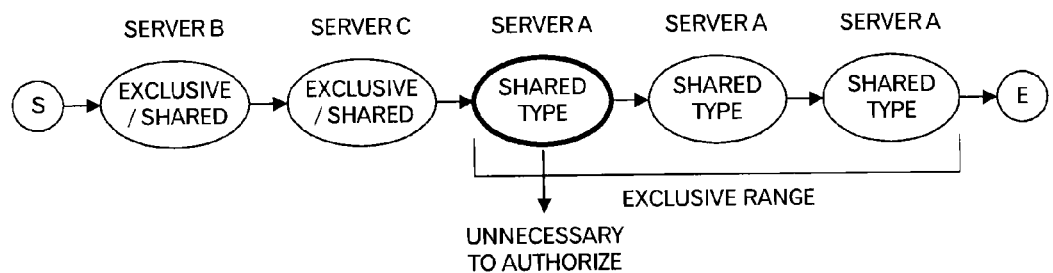
FIG. 21 is a diagram depicting an example of a transition without any authorization.

Moreover, as illustrated in FIG. 21, when the component attributes of the activities within the exclusive range are only shared type, the procedure for the authorization is not carried out. In such a case, it is presumed that the importance of such a series of operations is low.

Figure 22:
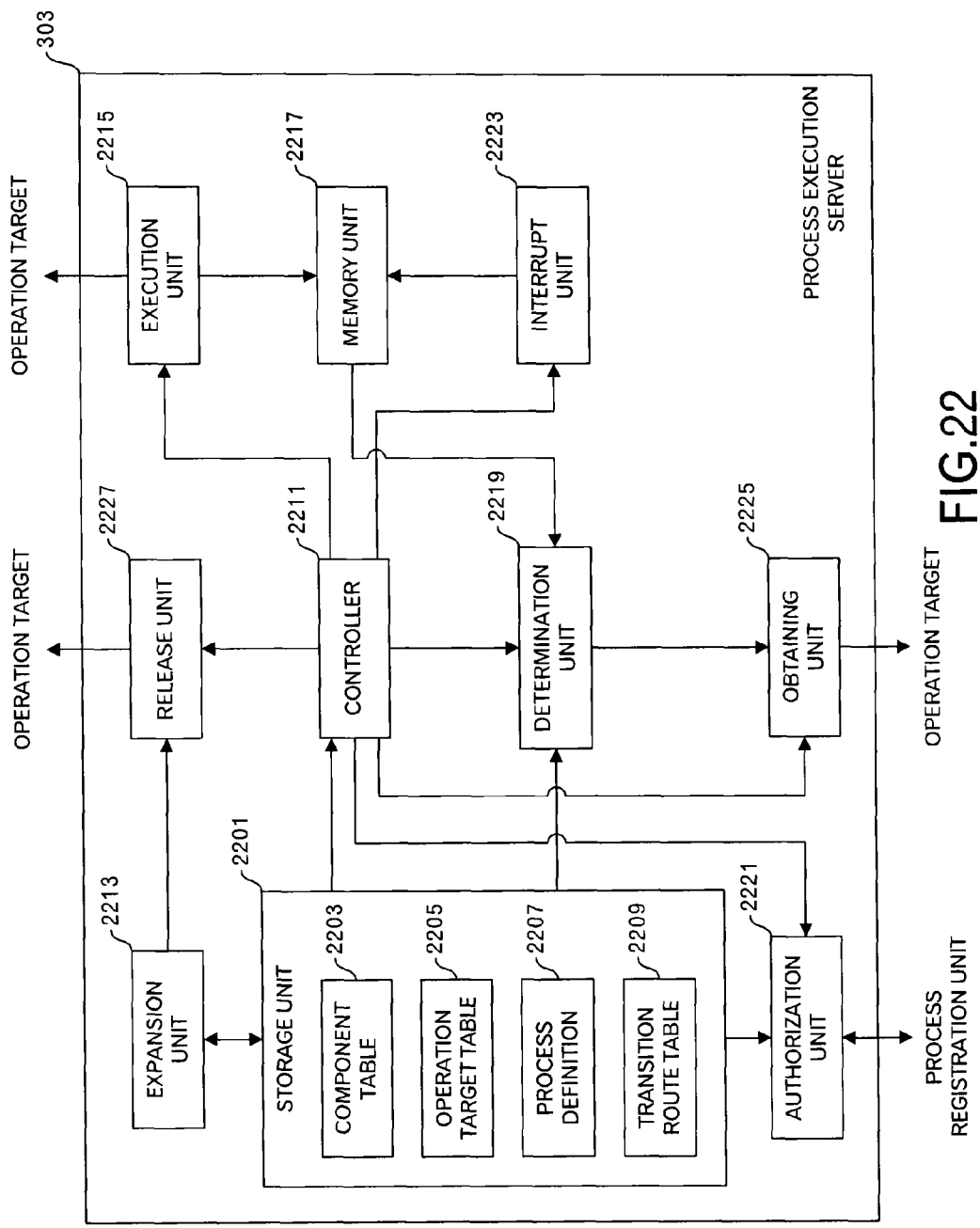
FIG. 22 is a diagram depicting a configuration example of a process execution server relating to control of the operational process.

FIG. 22 illustrates a configuration example of the process execution server 303 relating to the control of the operational process. The process execution server 303 has a storage unit 2201, controller 2211, expansion unit 2213, execution unit 2215, memory unit 2217, determination unit 2219, authorization unit 2221, interrupt unit 2223, obtaining unit 2225 and release unit 222".

The storage unit 2201 stores a component table 2203, operation target table 2205, process definition 2207 and transition route table 2209. The component table 2203 has a data structure as illustrated in FIG. 5, similarly to the component table 405 of the process registration terminal 301. The operation target table 2205 has a data structure as illustrated in FIG. 6, similarly to the operation target table 403 of the process registration terminal 301. However, when information such as the component attribute, manager name and necessity of the authorization is included in the process definition 2207, the component table 2203 and operation target table 2205 can be omitted.

The process definition 2207 is data received from the process registration terminal 301. The transition route table 2209 is data obtained by expanding the process definition 2207.

The controller 2211 is configured to control the entire activity execution processing such as specifying the activity to be executed. The expansion unit 2213 is configured to expand the process definition 2207 to the transition route table 2209. The execution unit 2215 is configured to execute the activity. More specifically, by executing the program, which is a component specified by the activity, the device to be operated, which is specified by the activity, is operated. The execution unit 2215 also has the components of the programs. The execution unit 2215 is further operated so as to store the execution history of the activities.

The memory unit 2217 stores the execution history and interrupt results of the activities. The determination unit 2219 is configured to determine the exclusion method or the like.

The authorization unit 2221 determines whether or not the authorization is necessary, requests the authorization if necessary, and determines whether or not the execution is granted. The interrupt unit 2223 is configured to perform a processing caused by the interrupt of the activity execution. The obtaining unit 2225 is configured to obtain the exclusive access right for the device of the operation target. More specifically, in addition to a method for requesting the device of the operation target to acquire the exclusive access right, for example, a manager for managing the exclusive access right may be provided within the process execution server 303 to request the manager to acquire the exclusive access right.

The release unit 2227 releases the exclusive access right for the device of the operation target depending on the circumstances. Specifically, a method for notifying the device of the operation target of abandonment of the exclusive access right may be employed, or a manager that manages the exclusive access right may be provided within the process execution server 303 to notify the manager of the abandonment of the exclusive access right.

Figure 23:
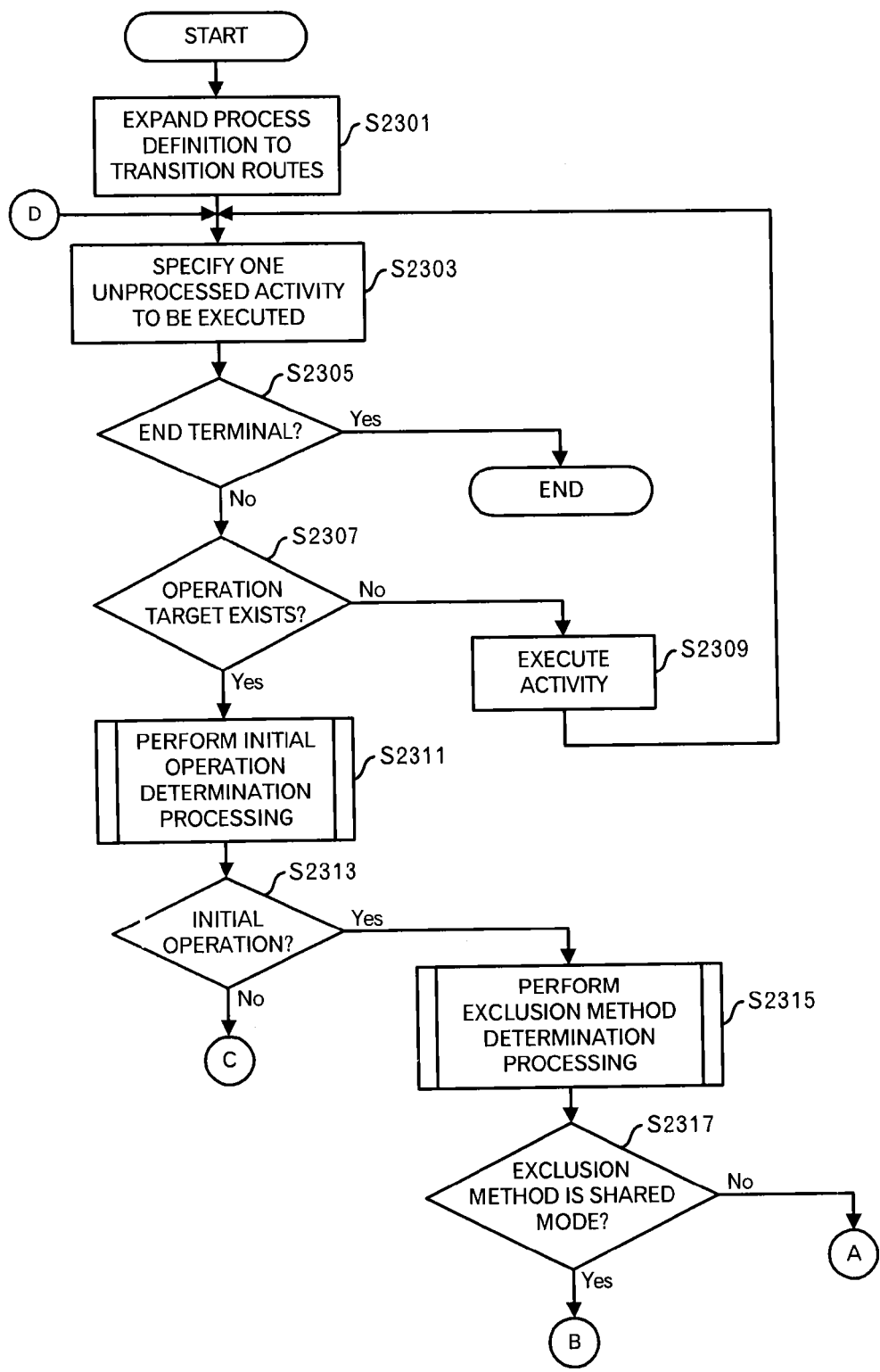
FIG. 23 is a diagram depicting an example of a control processing flow for the operational process.

FIG. 23 illustrates a flow example of a control processing of the operational process. The expansion unit 2213 expands the process definition 2207 to transition routes (S2301). Specifically, the expansion unit 2213 reads activities from the process definition 2207 to specify activities of the transition destination, and generates the transition routes. When plural transition destinations exist as a branch, all transition routes are specified according to each of branches.

FIG. 24 illustrates an example of the transition route table 2209. This figure illustrates the transition routes of the operational process illustrated in FIG. 7. In the transition route table 2209, for each transition route, activities and an end terminal are arranged in order of the transition.

Here, in order to simplify the explanation, a model of a simplified operational process is depicted in FIG. 25. FIG. 25 depicts activities A1 to A7, and activities A1 and A4 in which the branch occurs. In addition, FIG. 25 depicts activities A2, A3, A5, A6 and A7, which no branch occurs. Moreover, S represents a start terminal, and E represents an end terminal.

FIG. 26 illustrates a model of the transition route table 2209 obtained expanding the operational process in FIG. 25. 4 transition routes including the first to fourth transition routes are illustrated. Like this figure, activities and the end terminal are arranged in the transition route table 2209 for each transition route.

Returning to the explanation of FIG. 23, the controller 2211 identifies an unprocessed activity to be executed in sequence from the process definition 2207 (S2303). Specifically, the controller 2211 identifies the activity of the transition destination from the first activity in sequence. When the transition destination is branched off, in other words, when there are plural activities of the transition destinations, the activity of the transition destination, which satisfies the transition condition, is selected as the activity to be executed. For example, in an example of the operational process illustrated in FIGS. 7 and 13, activity 701 whose activity number is A1 is firstly specified as an activity to be executed, and when the execution result of the activity 701 is success, activity 702 whose activity number is A2 is next specified as an activity to be executed, and when the execution result of the activity 701 is failure, the activity 709 whose activity number is A9 is specified as the activity to be executed.

The determination unit 2219 determines whether or not this activity is an end terminal (S2305). When it is determined that this activity is the end terminal, the processing ends. For example, in the model of the operational process illustrated in FIGS. 25 and 26, after the activity whose activity number is A7 is executed, the activity to be executed next is the end terminal E. Therefore, the processing ends, because there is no activity to be executed subsequently.

When the activity is not the end terminal, the processing shifts to S2307. When S2303 is executed in the first round, there is another activity to be executed, so it is determined at S2305 that the activity is not the end terminal.

Next, the determination unit 2219 determines whether or not any device of the operation target is set for the activity to be executed (S2307). Here, when any device name is set in the column of the operation target, which is included in the record of the activity to be executed, in the process definition 2207, the determination unit 2219 determines that there is a device of the operation target, and when none is set in the column of the operation target, which is included in the record of the activity to be executed, in the process definition 2207, the determination unit 2219 determines that there is no device of the operation target.

Then, when there is no device of the operation target for the activity to be executed, the execution unit 2215 executes the activity (S2309), and stores the execution history in the memory unit 217, and the processing returns to S2303. For example, when activity 1801 in FIG. 18 is the activity to be executed, such a processing is executed. Because there is no need to acquire the authorization for the activity having no operation target, the determination whether or not the authorization is necessary is not carried out. Moreover, obtaining and releasing the exclusive access right are not executed.

On the other hand, when there is a device of the operation target for the activity to be executed, the determination unit 2219 performs an initial operation determination processing (S2311). The determination unit 2219 determines, in the initial operation determination processing, whether or not an initial operation is performed for the device specified by the activity to be executed, based on the process definition 2207.

Figure 27:
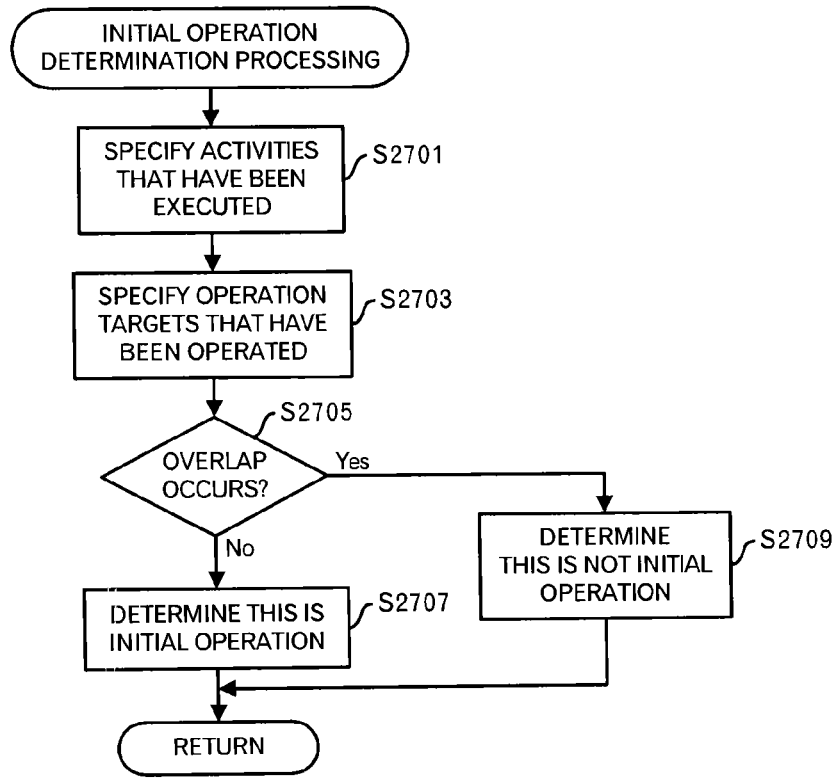
FIG. 27 is a diagram depicting a flow example of a processing for determining an initial operation.

FIG. 27 illustrates a flow example of the initial operation determination processing. The determination unit 2219 identifies activities that have been processed (S2701). In other words, the determination unit 2219 identifies activities before the activity to be executed. The activities that have been processed are obtained from the execution history in the memory unit 2217. For example, when the activity 1505 in FIG. 15 is the activity to be executed, the activities 1501 and 1503 that have been processed are specified. Then, the determination unit 2219 identifies operation targets that have been operated (S2703). Specifically, the determination unit 2219 reads devices of the operation targets, which are included in the records of the activities that have been executed, from the process definition 2207. In the example of FIG. 15, the servers B and C are the operation targets that have been operated.

Then, the determination unit 2219 determines whether or not the device of the operation target for the activity to be executed matches any one of the devices of the operation targets that have been operated (S2705). When it is determined that the device of the operation target for the activity to be executed does not match any one of the devices of the operation targets that have been operated, the determination unit 2219 determines this is an initial operation (S2707). In the example of FIG. 15, the server A that is the operation target of the activity 1505 does not match any one of the servers B and C that are the operation targets that have been operated, so it is determined that this is the first operation.

On the other hand, when the device of the operation target for the activity to be executed matches any one of the devices of the operation targets that have been operated, the determination unit 2219 determines that this is not the initial operation (S2709). When the activity 1507 in the example of FIG. 15 is the activity to be executed, the server A that is the operation target matches the server A that is the operation target for the activity 1505 that has been executed. Therefore, it is determined that this is not the initial operation. Then, the processing returns to S2313 in FIG. 23.

Returning to the explanation of the processing in FIG. 23, the controller 2211 determines whether or not the determination result of the initial operation determination processing (S2311) is the initial operation (S2313). When the determination result is the initial operation, the determination unit 2219 performs a processing for determining an exclusion method (S2315). The determination unit 2219 determines the exclusion method set when obtaining the exclusive access right. For example, when the activity 1505 in FIG. 15 or activity 1601 in FIG. 16 is the activity to be executed, the processing for determining the exclusion method is performed.

Figure 28:
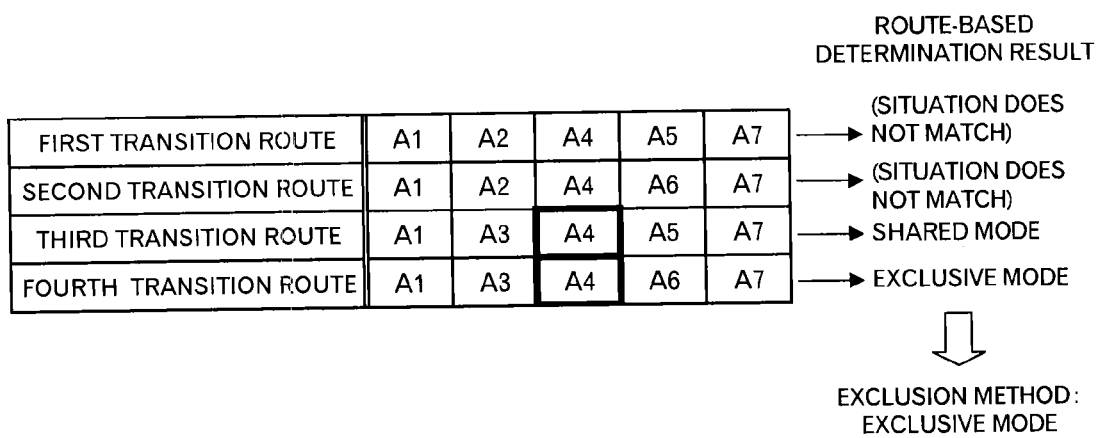
FIG. 28 is a diagram depicting an example of determining that the exclusion method is an exclusive mode.

Here, an outline of the exclusion method determination will be explained. FIG. 28 illustrates an example in which the exclusion method is determined to be the exclusive mode. The activity to be executed is represented by the bold line. For example, in case of the model of the operational process, which are illustrated in FIGS. 25 and 26, the activities A1 and A3 were executed, and when the activity A4 is the activity to be executed next, the determination is not made for the first and second transition routes, because the situation up to this stage is different. The determination is made only for the third and fourth transition routes, which match the situation up to this stage. Then, an exclusion method suitable for each of the third transition route and fourth transition route is determined. This determination result is called a route-based determination result. When any one of the route-based determination results is the exclusive mode, the exclusive mode is set as the exclusion method. In this example, because the route-based determination result of the fourth transition route is the exclusive mode, the exclusive mode is set as the entire exclusion method. In order to prepare a case of shifting to the fourth transition route, the exclusive state is secured.

Figure 29:
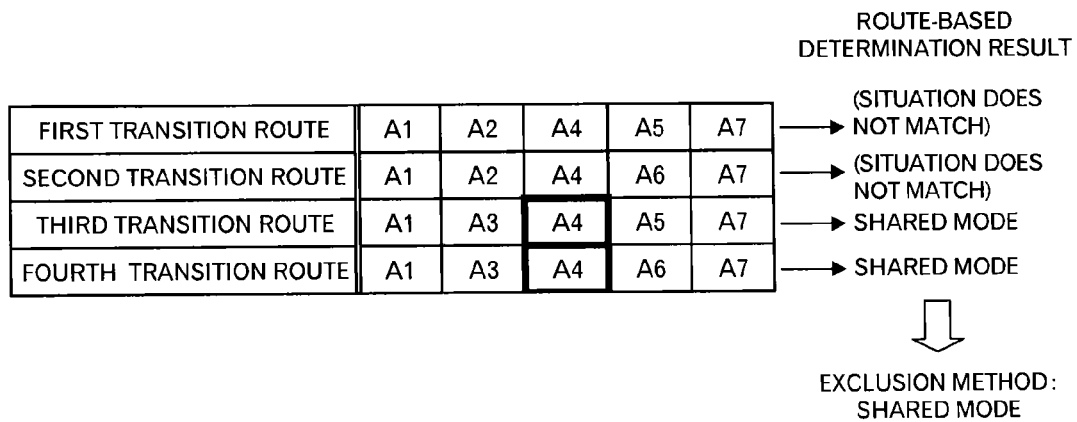
FIG. 29 is a diagram depicting an example of determining that the exclusion method is a shared mode.

FIG. 29 illustrates an example for which the exclusion method is determined to be the shared mode. Similarly to FIG. 28, when the activities A1 and A3 are executed, and the activity to be executed next is the activity A4, the determination is not made for the first and second transition routes, because the situation up to this stage is different. Therefore, the determination is made only for the third and fourth transition routes, which matches the situation up to this stage. Both of the route-based determination results of the third and fourth transition routes are the shared mode. Thus, when the route-based determination results do not include the exclusive mode, and any one of the route-based determination results is the shared mode, the shared mode is selected for the exclusion method. Even when the subsequent transition is considered, the exclusive state does not have to be secure. Thus, unnecessary exclusive states are avoided.

Figure 30:
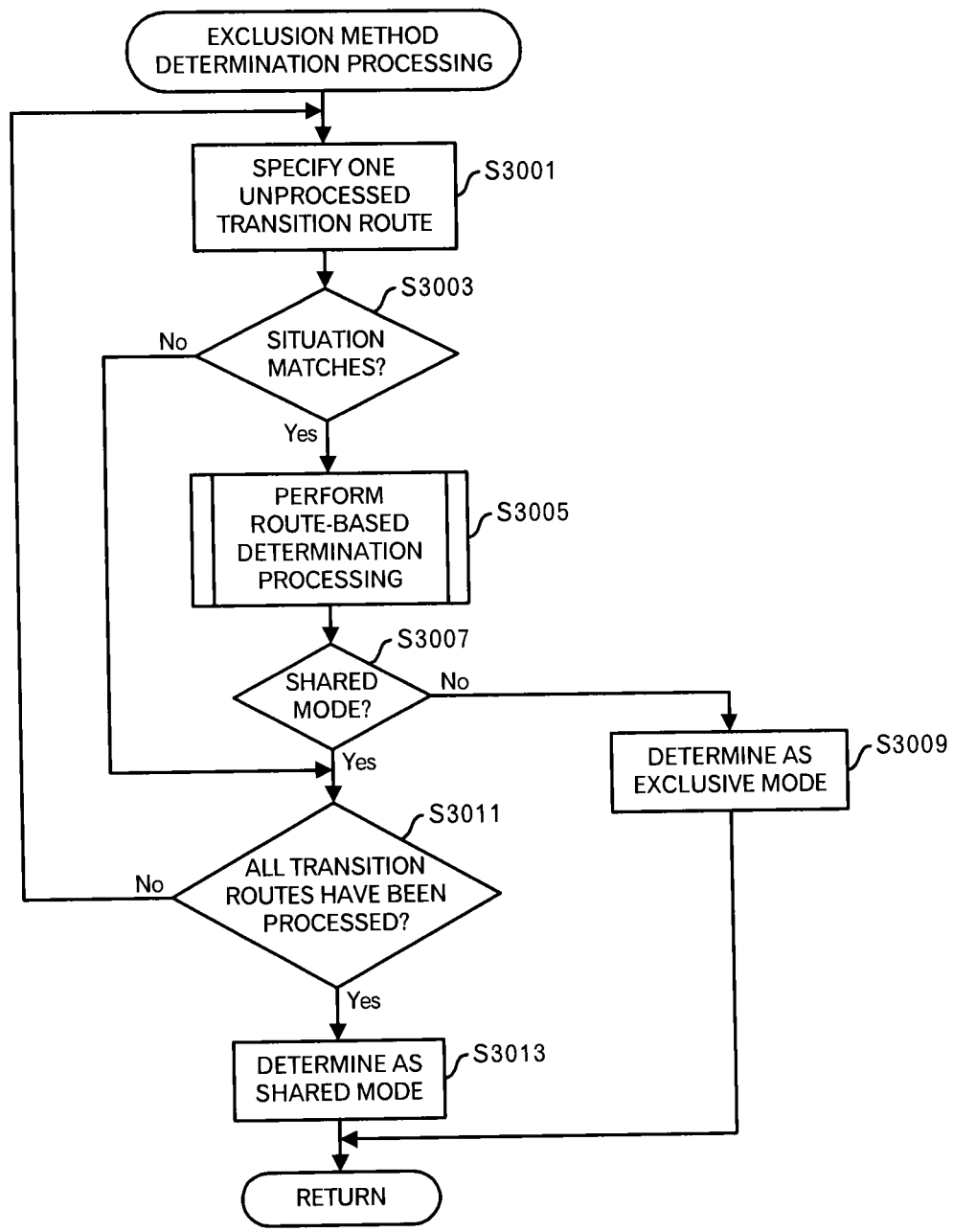
FIG. 30 is a diagram depicting a flow example of a processing for determining the exclusion method.

The processing for determining the exclusion method will be explained according to the aforementioned outline. FIG. 30 illustrates a flow example of the processing for determining the exclusion method. The determination unit 2219 identifies one unprocessed transition route in the transition route table 2209 (S3001). The determination unit 2219 determines whether or not the specified transition route matches the situation up to this stage (S3003). Specifically, the determination unit 2219 determines the transition route matches the situation when the transition route includes activities that match the activities that have been executed. When it is determined the transition route does not match the situation up to this stage, this transition route is not processed, so the processing shifts to S3011. The determination unit 2219 obtains the activities that have been executed from the execution history in the memory unit 2217.

On the other hand, when it is determined that the transition route matches the situation up to this stage, the determination unit 2219 carries out the route-based determination processing (S3005).

In this route-based determination processing, when the any component attribute in the activities included in the exclusive range is the exclusive type, the exclusive mode is determined, and when any component attribute is the shared type and any one of the component attributes is not the exclusive type, the shared mode is determined. In the following, the outline will be explained.

Figure 31:
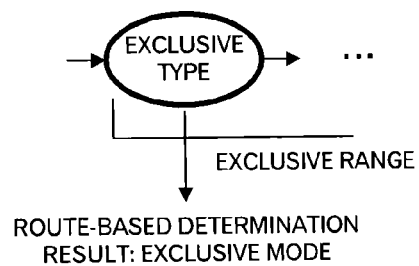
FIG. 31 is a diagram depicting an example in which the route-based determination result is the exclusive mode.

In examples of FIGS. 31 to 34, the activity to be executed is illustrated by the bold line. As illustrated in FIG. 31, when the component attribute of the activity for the initial operation represents the exclusive type, the exclusive mode is employed as the route-based determination result. At this time, this is because it is clear that the exclusive range includes the activity whose component type represents the exclusive type.

Figure 32:
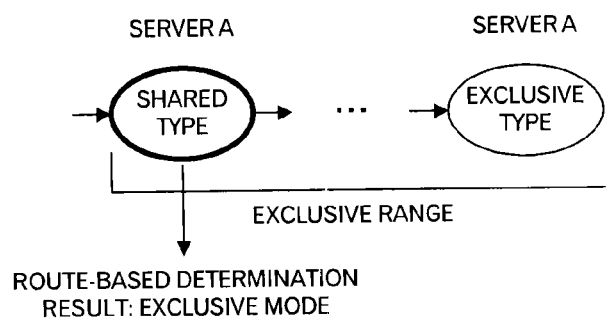
FIG. 32 is a diagram depicting an example in which the route-based determination result is the exclusive mode.

As illustrated in FIG. 32, even when the component attribute for the initial activity represents the shared type, in case where the component attribute for another activity in the exclusive range represents the exclusive type, the exclusive mode is adopted as the route-based determination result. This pattern is specified by checking the component attributes for the later activities included in the exclusive range.

Figure 33:
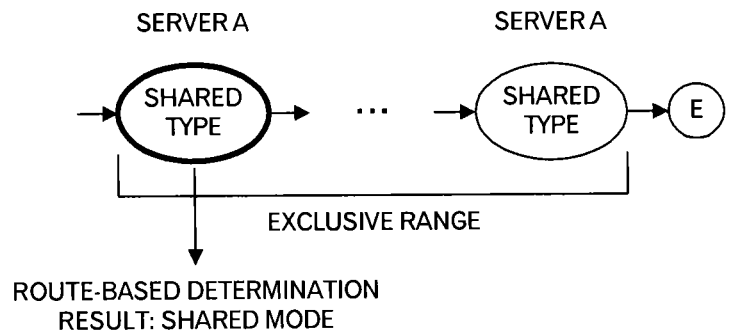
FIG. 33 is a diagram depicting an example in which the route-based determination result is the shared mode.

As illustrated in FIG. 33, when the activity whose the component attribute represents the exclusive type is not included in the exclusive range, the shared mode is employed as the route-based determination result. This pattern is also specified by checking all activities included in the exclusive range. In this example, the exclusive range ends before the end terminal E.

Figure 34:
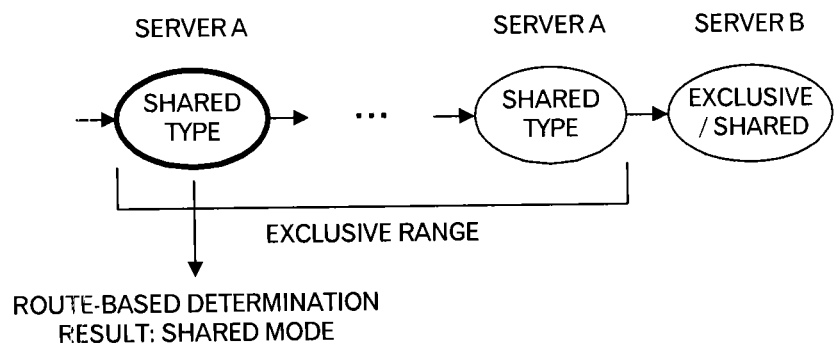
FIG. 34 is a diagram depicting an example in which the route-based determination result is the shared mode.

Also in FIG. 34, because the activities whose component attribute represents the exclusive type is not included in the exclusive range, the shared mode is adopted for the route-based determination result. This pattern is specified by checking the component attributes of all of the activities included in the exclusive range. In this example, the exclusive range ends before the activity that operates another device (i.e. server B) as the operation target.

Figure 35:
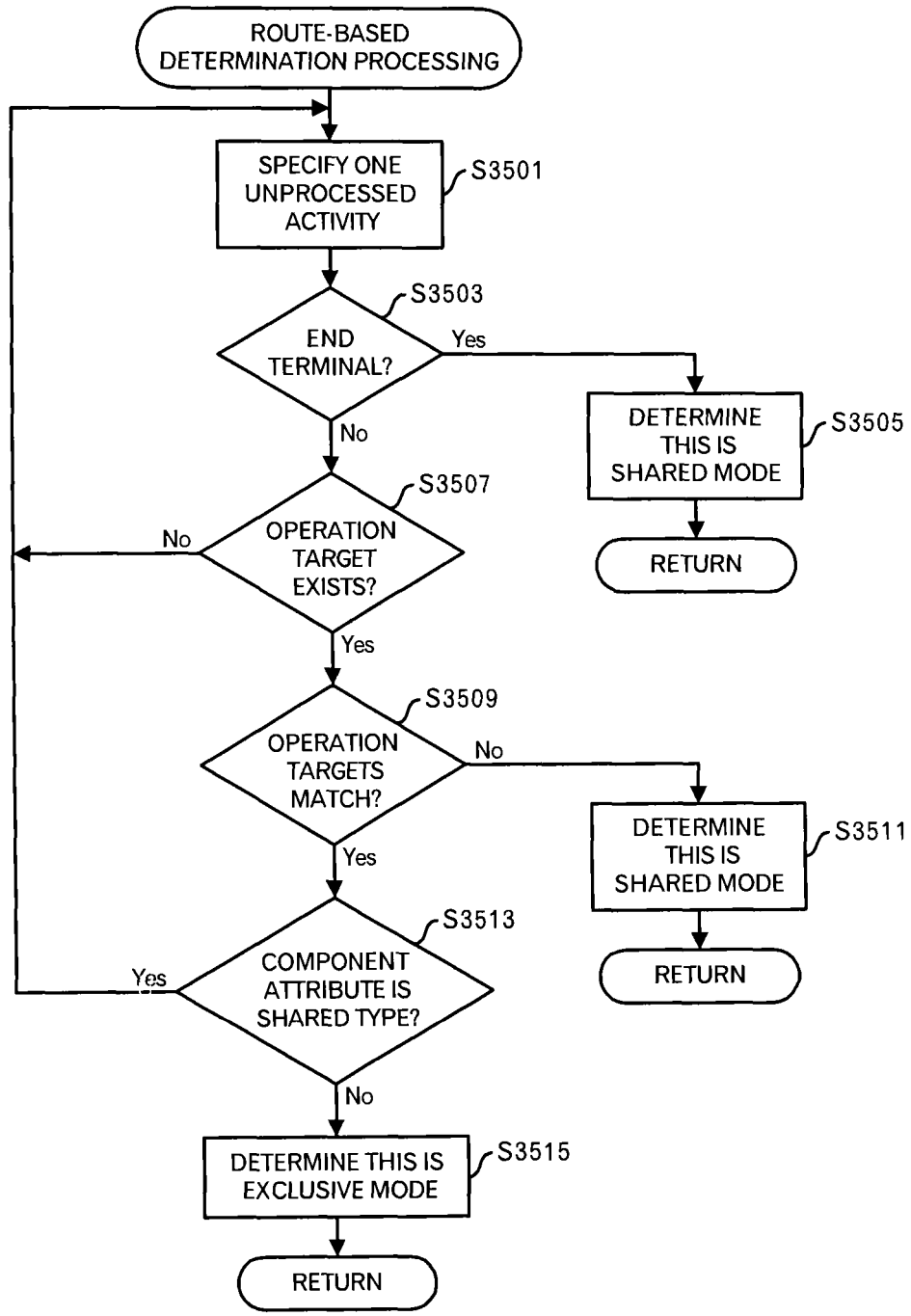
FIG. 35 is a diagram depicting a flow example of the route-based determination processing.

The route-based determination processing will be explained according to the aforementioned outline. FIG. 35 illustrates a flow example of the route-based determination processing. The determination unit 2219 identifies one activity to be determined in sequence (S3501). The determination unit 2219 identifies the activity to be executed as the activity to be determined in the first round. After the first round, the next activity is specified as the activity to be determined along the transition route.

The determination unit 2219 determines whether or not the end terminal is specified as the determination target instead of the activity (S3503). That the end terminal is specified means that there is no activity, because the trace reaches the end of the transition route. When it is determined that the end terminal is specified instead of the activity, the determination unit 2219 determines that the route-based determination result represents the shared mode (S3505). For example, when the determination target reaches the end terminal E in FIG. 33, the shared mode is determined. However, because the activity exists in the first round, the end terminal may be determined in the second round or subsequent round.

When it is determined that any activity is the determination target, the determination unit 2219 determines whether or not the device of the operation target is set for the activity to be determined (S3507). Specifically, when the device name is set in the column of the operation target included in the record for the activity, it is determined that the device of the operation target exists, and when none is set in the column of the operation target included in the record for the activity, it is determined that there is no device of the operation target.

When it is determined that there is no device of the operation target, the exclusive mode or shared mode is not determined, and a further later activity is used as the determination target. Therefore, the processing returns to S3501. For example, when the activity 1801 in FIG. 18 is the activity to be determined, the determination is suspended, and the next activity is specified as the determination target. Because the device of the operation target exists in the activities to be executed in the first round, it may be determined that there is no device of the operation target in the second round or subsequent rounds.

On the other hand, when it is determined that there is the device of the operation target, the determination unit 2219 determines whether or not the device of the operation target for the activity to be determined matches the device of the operation target for the activity to be executed (S3509). When it is determined that the device of the operation target for the activity to be determined does not match the device of the operation target for the activity to be executed, the determination unit 2219 determines the route-based determination result is the shared mode (S3511). In an example of FIG. 34, when it is determined that the server B, which is the operation target for the activity to be determined, does not match the server A, which is the operation target for the activity to be executed, the route-based determination result becomes the shared mode. However, in the first round in which the initial activity is processed, it is determined that the devices of the operation targets match.

When it is determined that the device of the operation target for the activity to be determined matches the device of the operation target for the activity to be executed, the determination unit 2219 determines whether the component attribute for the activity to be executed is the shared type or the exclusive type (S3513). Specifically, the determination unit 2219 identifies the activity number from the transition route, identifies the component ID corresponding to the activity number from the process definition 2207, and identifies the component attribute corresponding to the component ID from the component table 2203. When the component attribute is included in the process definition 2207, the determination unit 2219 may use it. By using the component attribute included in the process definition 2207, the processing loads can be reduced.

When it is determined that the component attribute is the exclusive type, the determination unit 2219 determines that the route-based determination result is the exclusive mode (S3515). With this processing, in the example of FIG. 31, it is determined in the first round, that the route-based determination result is the exclusive mode. In an example of FIG. 32, it is determined, in the second round and subsequent rounds, that the route-based determination result is the exclusive mode.

On the other hand, when it is determined that the component attribute is the shared type, the processing returns to S3501. In an example of FIG. 33, it is repeatedly determined that the component attribute is the shared type, until the target to be determined reaches the end terminal E. Thus, the route-based determination result can be obtained.

Returning to the explanation of the processing in FIG. 30, the determination unit 2219 determines whether or not the determination result of the route-based determination processing is the shared mode (S3007). When it is determined that the determination result of the route-based determination processing is not the shared mode, the determination unit 2219 determines that the exclusion method is the exclusive mode (S3009). In the example of FIG. 28, when it is determined that the route-based determination result for the fourth transition route is the exclusive mode, the exclusion method becomes the exclusive mode.

On the other hand, when it is determined that the determination result of the route-based determination processing is the shared mode, the determination unit 2219 determines whether or not all of the transition routes have been processed (S3011). When it is determined that all of the transition routes have been processed, the determination unit 2219 determines that the exclusion method is the shared mode (S3013). In the example of FIG. 29, when it is determined that all of the route-based determination results until the final fourth transition route are the share mode, the exclusion method becomes the shared mode.

When it is determined that there is an unprocessed transition route, the processing returns to S3001. Thus, the exclusion method is obtained as a whole.

Returning to the explanation of the processing in FIG. 23, the controller 2211 determines whether or not the exclusion method is the shared mode (S2317). When it is determined that the exclusion method is not the shared mode, the processing shifts to S3601 in FIG. 36 through terminal A.

Figure 36:
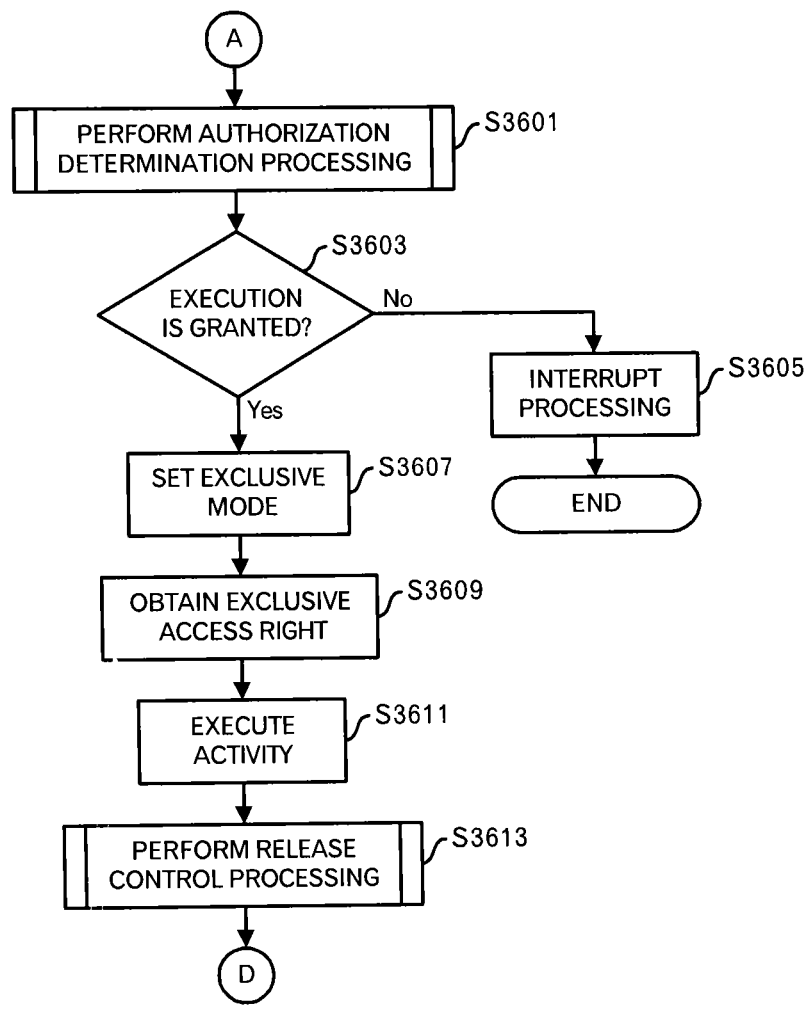
FIG. 36 is a diagram depicting a flow example of the control processing for the initial operation and the exclusive mode.

FIG. 36 illustrates a control processing flow after the terminal A, which is executed in the initial operation and in the exclusive mode. The authorization unit 2221 performs an authorization determination processing (S3601). The authorization unit 2221 determines, in the authorization determination processing, necessity of the authorization, and if necessary, the authorization unit 2221 requests the manager to perform the authorization, and determines whether or not the execution of the activity can be made.

Figure 37:
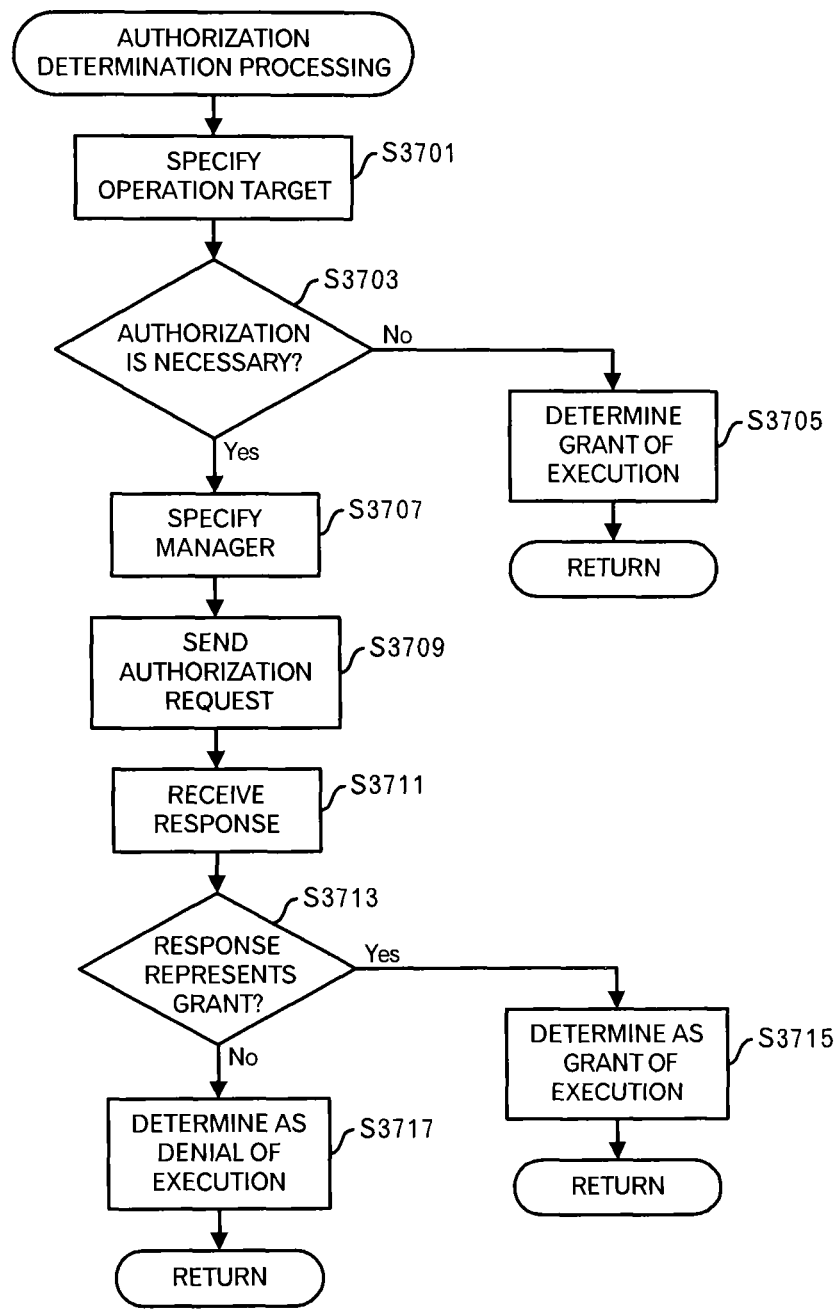
FIG. 37 is a diagram depicting a flow example of an authorization determination processing.

FIG. 37 illustrates a flow example of the authorization determination processing. The authorization unit 2221 identifies a device of the operation target for the activity to be executed, based on the process definition 2207 (S3701). The authorization unit 2221 further identifies the necessity of the authorization for the device of the operation target, based on the operation target table 2205. When the process definition 2207 includes the necessity of the authorization, the authorization unit 2221 may use it. By using the necessity of the authorization, which is included in the process definition 2207, the processing loads can be reduced. The authorization unit 2221 determines the necessity of the authorization (S3703), and when the authorization is not necessary, the authorization unit 2221 determines that the result of the authorization determination processing is "grant of execution" (S3705). In the example of FIG. 20, because "unnecessary" for the necessity of the authorization is set for the server B, the grant of the execution is determined.

On the other hand, the authorization unit 2221 determines the necessity of the authorization (S3703), and when the authorization is necessary, the authorization unit 2221 identifies the manager (S3707), and transmits an authorization request to the manager terminal 307 (S3709). Specifically, the authorization unit 2221 identifies the manager name associated with the device, based on the operation target table 2205. When the manager name is included in the process definition 2207, the authorization unit 2221 may use it. By using the manager name included in the process definition 2207, the processing loads can be reduced. In the example of FIG. 19, because "necessary" is set for the necessity of the authorization for the server A, the authorization request is sent.

Then, the authorization unit 2221 receives a response from the manager terminal 307 (S3711). The authorization unit 2221 determines whether or not the response represents the grant (S3713). When it is determined that the response is grant, the authorization unit 221 determines the result of the authorization determination processing is grant of the execution (S3715). On the other hand, when it is determined that the response is rejection, the authorization unit 2221 determines that the result of the authorization determination processing is denial of the execution (S3717).

Returning to the explanation of the processing in FIG. 36, the controller 2211 determines whether or not the determination result is the grant of the execution (S3603). When it is determined that the determination result is denial of the execution, the interrupt unit 2223 performs the interrupt processing (S3605). In the interrupt processing, the interrupt unit 2223 stores, as the history information, identification information of the operational process, which was interrupted, and the determination result representing that the authorization determination processing is the denial of the execution into the memory unit 2217.

When it is determined that the determination result is the grant of the execution, the obtaining unit 2225 sets the exclusive mode as the exclusion method (S3607), and obtains the exclusive access right (S3609). After the exclusive access right is obtained, the interruption to the device of the operation target by other operational processes is denied.

After the exclusive access right is obtained, the execution unit 2215 executes the activity (S3611). Specifically, the execution unit 2215 executes a program that is a component specified by the activity. The execution unit 2215 stores the execution history in the memory unit 2217.

After the activity is executed, the release unit 2227 performs a release control processing (S3613). In the release control processing, the release unit 2227 releases the exclusive access right for the device of the operation target depending on circumstances.

Figure 38:
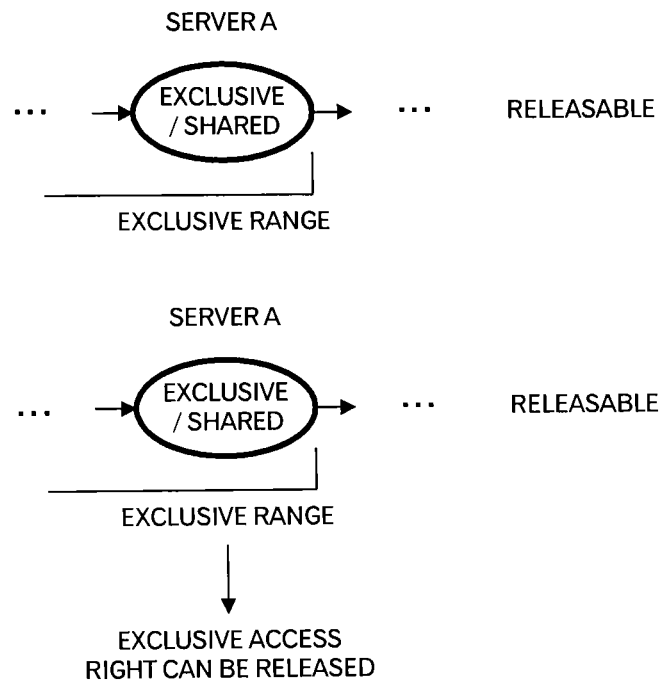
FIG. 38 is a diagram depicting an example in which the exclusive access right is released.

Here, an outline of releasing the exclusive access right will be explained. As illustrated in FIG. 38, when it is determined that the exclusive access right can be released, for all of the transition routes, the exclusive access right is released. In such a case, even when any transition route is traced, it is not necessary to hold the exclusive access right.

Figure 39:
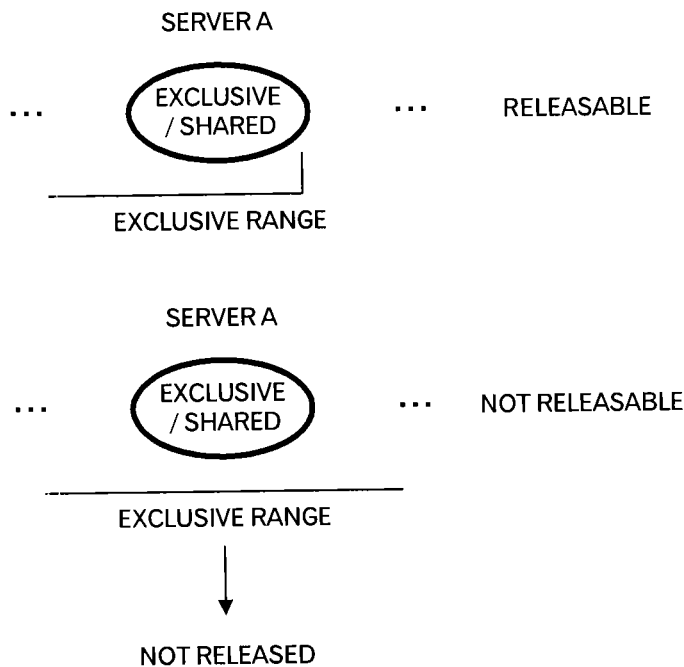
FIG. 39 is a diagram depicting an example in which the exclusive access right is not released.

As illustrated in FIG. 39, when it is determined that the exclusive access right cannot be released, for anyone of the transition routes, the exclusive access right is not released. In such a case, by considering a case where the transition route, for which the exclusive access right cannot be released, is traced, the exclusive access right is held.

Figure 40:
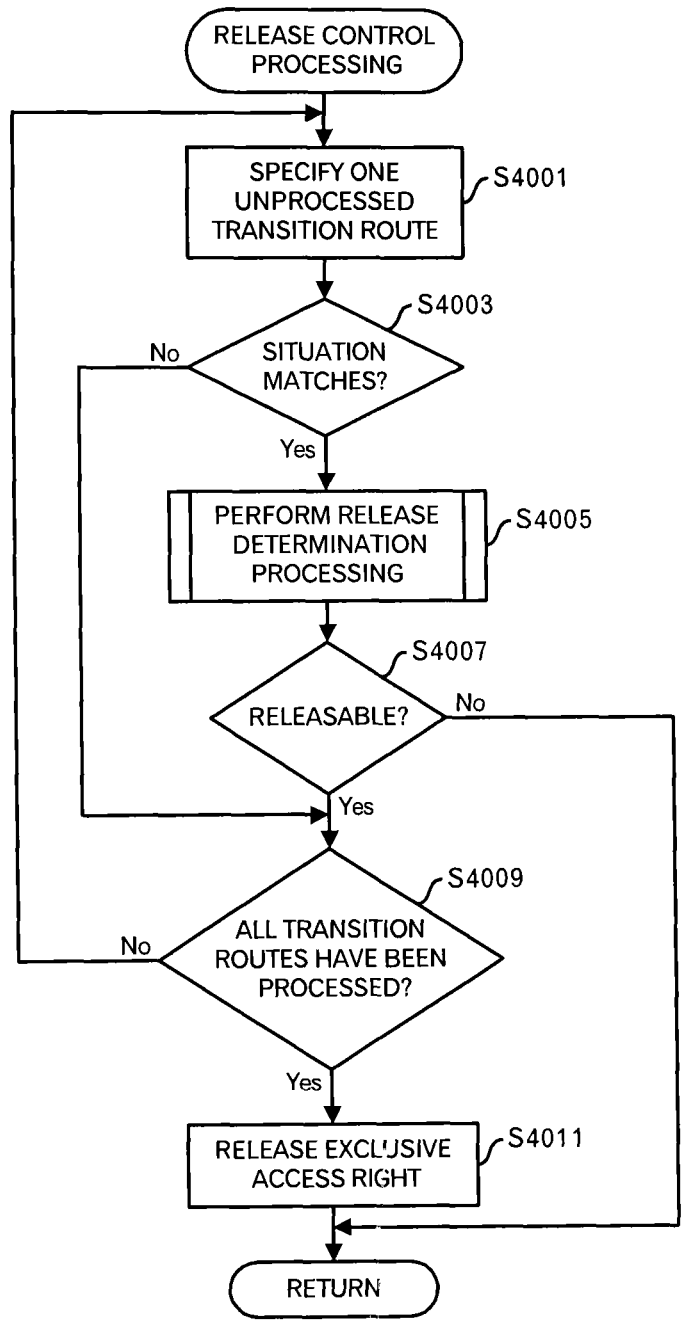
FIG. 40 is a diagram depicting a flow example of a release control processing.

The release unit 2227 performs the release control processing according to the aforementioned outline. FIG. 40 illustrates a flow example of the release control processing. The release unit 2227 identifies one unprocessed transition route in the transition route table 2209 (S4001). The release unit 2227 determines whether or not the situation up to this stage matches the specified transition route (S4003). Specifically, it is determined that the situation up to this stage matches, in case of the transition route including the activities that match the activities that have been executed. When it is determined that the situation up to this stage does not match, the release determination processing is not carried out for the transition route. Therefore, the processing shifts to S4009. The release unit 2227 obtains the activities that have been executed from the execution history stored in the memory unit 2217.

On the other hand, when it is determined that the situation up to this stage matches, the release unit 2227 performs a release determination processing (S4005).

Figure 41:
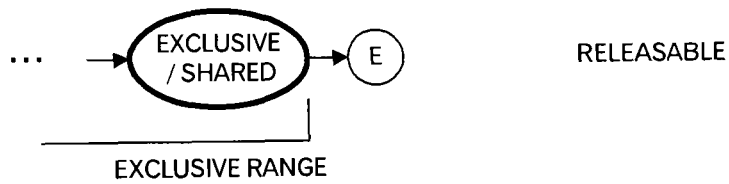
FIG. 41 is a diagram depicting an example in which it is determined that the exclusive access right can be released.

Here, an outline of the release determination processing will be explained. In examples of FIGS. 41 to 46, the activity to be executed is illustrated by the bold line. As illustrated in FIG. 41, when there is no next activity, in other words, when the next step is the end terminal, it is determined that the exclusive access right is releasable. This is because no operation is executed for the device any more.

Figure 42:
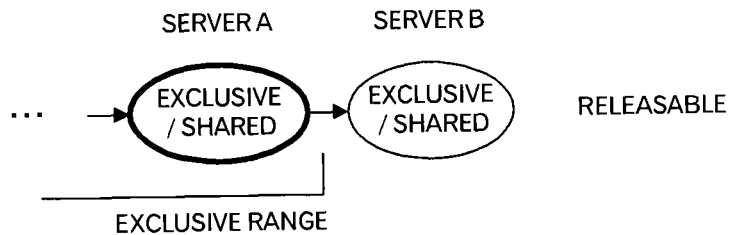
FIG. 42 is a diagram depicting an example in which it is determined that the exclusive access right can be released.

As illustrated in FIG. 42, when the next activity is an activity for another device, it is determined that the exclusive access right can be released. It is considered that a series of operations for the device is completed.

Figure 43:
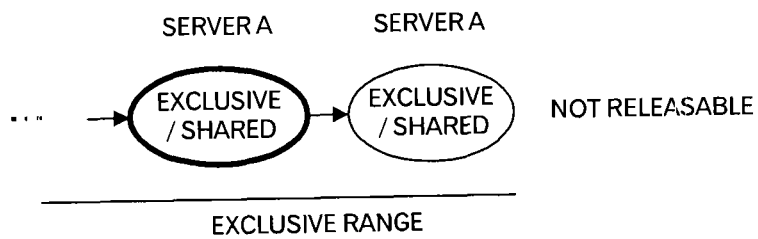
FIG. 43 is a diagram depicting an example in which it is determined that the exclusive access right cannot be released.

As illustrated in FIG. 43, when the next activity is an activity for the same device, it is determined that the exclusive access right cannot be released. This is because it is considered that a series of operations for the device has not been completed, yet.

Figure 44:
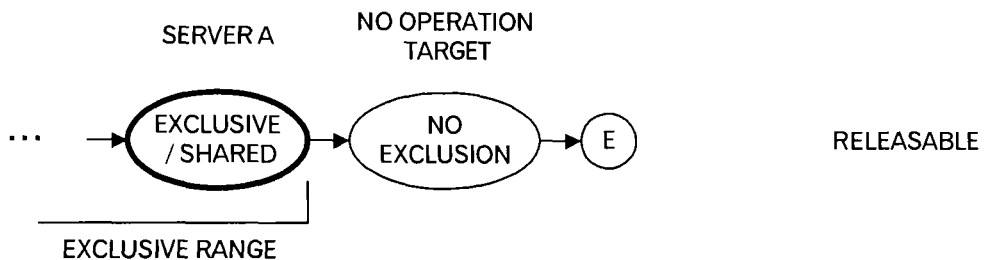
FIG. 44 is a diagram depicting an example in which it is determined that the exclusive access right can be released.

As illustrated in FIG. 44, when there is no operation target for the next activity, and there is no further next activity, it is determined that the exclusive access right can be released. This is because no operation for the device is carried out any more.

Figure 45:
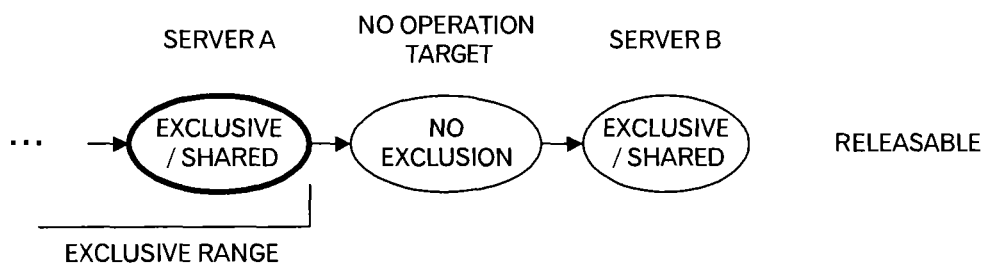
FIG. 45 is a diagram depicting an example in which it is determined that the exclusive access right can be released.

As illustrated in FIG. 45, when there is no operation target for the next activity, and the next activity is an activity for another device, it is determined that the exclusive access right can be released. This is because it is considered that a series of operations for the device has been completed.

Figure 46:
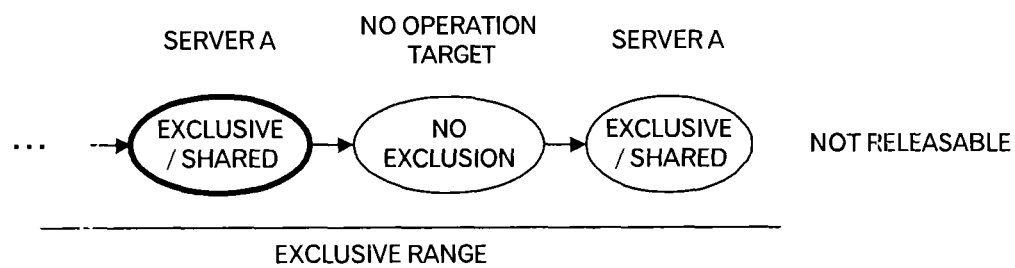
FIG. 46 is a diagram depicting an example in which it is determined that the exclusive access right cannot be released.

As illustrated in FIG. 46, when there is no operation target for the next activity, and the further next activity is an activity for the same device, it is determined that the exclusive access right cannot be released. This is because it is considered that a series of operations for the device has not been completed, yet.

Figure 47:
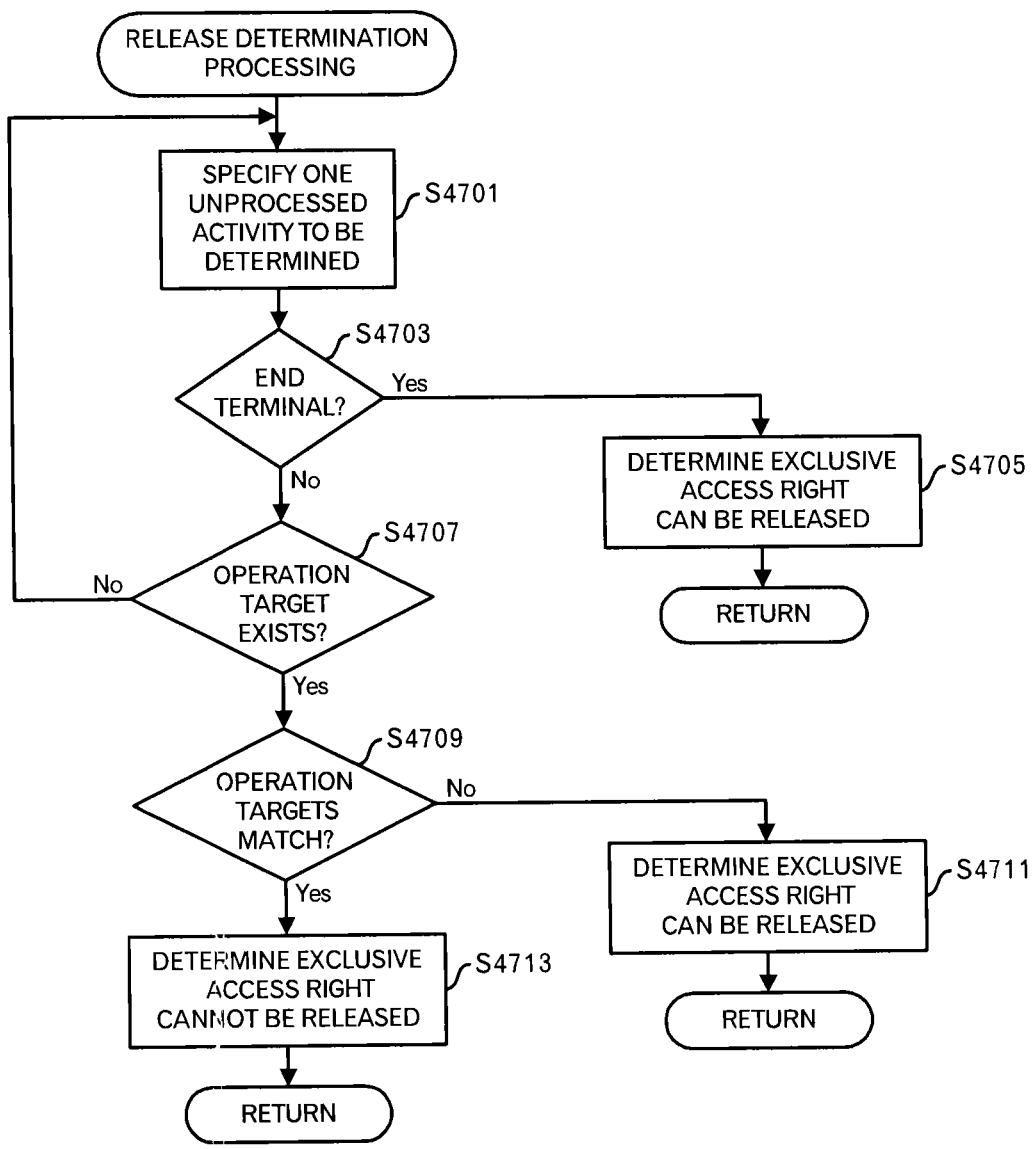
FIG. 47 is a diagram depicting a flow example of a release determination processing.

FIG. 47 illustrates a flow example of the release determination processing. The release unit 227 identifies one unprocessed activity to be determined (S4701). Specifically, the release unit 2227 determines the activity to be executed in the first round. After that, the next activity is specified along with the transition route.

The release unit 2227 determines whether or not the end terminal is specified instead of the activity (S4703). When it is determined that there is no next activity, and the end terminal is specified instead of the activity, the release unit 2227 determines that the exclusive access right can be released (S4705). In an example of FIG. 41, it is determined at the activity before the end terminal that the exclusive access right can be released. The processing returns to the calling-source processing.

When it is determined that any activity is specified instead of the end terminal, the release unit 2227 determines whether or not any device of the operation target is set for the activity to be determined (S4707). Specifically, when any device name is set in the column of the operation target, which is included in the record for the activity, it is determined that there is a device of the operation target, and when none is set in the column of the operation target, which is included in the record for the activity, it is determined that there is no device of the operation target.

When it is determined that there is no device of the operation target, no determination for releasable or not releasable is made, and in order to check the further next activity, the processing returns to S4701. For example, in the examples of FIGS. 44 to 46, because there is no device of the operation target for the activity next to the activity to be executed, the further next activity is checked. In case of FIG. 44, it is determined that the exclusive access right can be released at S4705 after that. Thus, because the further next activity is checked when it is determined that there is no device of the operation target, it is possible to early release the exclusive access right by anticipating the future status.

On the other hand, when it is determined that the device of the operation target exists, the release unit 2227 determines whether or not the device of the operation target for the activity to be determined matches the device of the operation target for the activity to be executed (S4709). When it is determined that the device of the operation target for the activity to be determined does not match the device of the operation target for the activity to be executed, the release unit 2227 determines that the device (i.e. the exclusive access right) is releasable (S4711). In the examples of FIGS. 42 and 45, it is determined that the device can be released. Then, the processing returns to S4007 in FIG. 40.

When it is determined that the device of the operation target for the activity to be determined matches the device of the operation target for the activity to be executed, the release unit 2227 determines that the device cannot be released (S4713). In the examples of FIGS. 43 and 46, it is determined that the device cannot be released. Then, the processing returns to S4007 in FIG. 40.

Returning to the explanation of the processing in FIG. 40, the release unit 2227 determines whether or not the determination result of the release determination processing represents that the device can be released (S4007). When it is determined that the determination result of the release determination processing represents that the device cannot be released, the processing ends without releasing the exclusive access right. In the example of FIG. 39, because the determination result of the release determination processing for the second transition route represents that the device cannot be released, the processing ends without releasing the exclusive access right. Then, the processing returns to the processing of FIG. 36, and further returns to S2303 in FIG. 23 through terminal D.

When it is determined that the determination result of the release determination processing represents that the device can be released, the release unit 2227 determines whether or not all of the transition routes have been processed (S4009). When it is determined that there is an unprocessed transition route, the processing returns to S4001 to repeat the determination for the remaining transition routes.

When it is determined that all of the transition routes have been processed, the release unit 2227 releases the exclusive access right (S4011). In the example of FIG. 38, it is determined that the first and second transition routes can be released, and when it is determined that there is no transition route other than those transition routes, the exclusive access right can be released. Then, the processing returns to the processing of FIG. 36, and further returns to S2303 in FIG. 23 through the terminal D.

Figure 48:
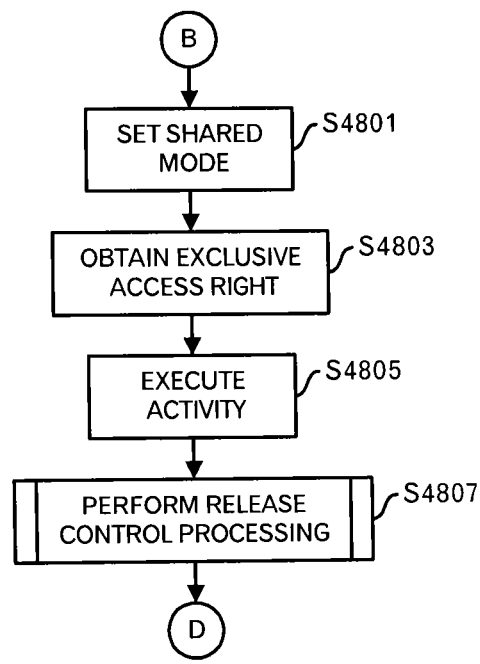
FIG. 48 is a diagram depicting a flow example of a control processing for the initial operation and shared mode.

When it is determined at S2317 of FIG. 23, that the exclusion method is the shared mode, the processing shifts to S4801 in FIG. 48 through terminal B.

FIG. 48 illustrates a flow example of the control processing for the initial operation and the shared mode. In case of the shared mode, because the authorization is not obtained as depicted in FIG. 21, the necessity of the authorization is not determined. The obtaining unit 2225 sets the shared mode as the exclusion method (S4801), and obtains the exclusive access right (S4803). After the exclusive access right was obtained, it is allowed to obtain the exclusive access right in the shared mode to the device of the operation target by other processes.

The execution unit 2215 that obtained the exclusive access right executes the activity, and stores the execution history in the memory unit 2217 (S4805). Specifically, the execution unit 2215 executes a program that is a component specified with the activity.

After the activity is executed, the release unit 2227 performs the release control processing (S4807). The release control processing by the release unit 2227 is the same as the aforementioned processing.

When the release control processing ends, the processing returns to S2303 in FIG. 23 through the terminal D.

Figure 49:
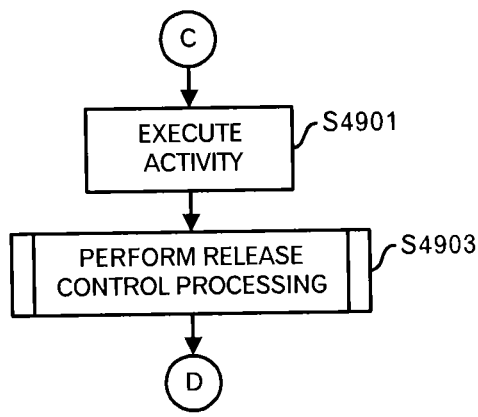
FIG. 49 is a diagram depicting a flow example of a control processing in case where the operation is not the initial operation.

Returning to FIG. 23, when it is determined, in the initial operation determination processing, that this is not the initial operation, the processing shifts to S4901 in FIG. 49 through the terminal C.

FIG. 49 illustrates a flow example of the control processing when this is not the initial operation. When this is not the initial operation, there is no case where the authorization is obtained. Therefore, the necessity of the authorization is not determined. Moreover, a processing to obtain the exclusive access right is not carried out. The execution unit 2215 executes the activity, and stores the execution history in the memory unit 2217 (S4901). When the execution of the activity ends, the release unit 2227 performs the release control processing (S4903). The release control processing by the release unit 2227 is the same as the aforementioned processing. Thus, the operational process is executed.

In the following, an example concerning the execution of the operational process will be explained. FIG. 50 illustrates an example of an exclusive range for each transition route. In this example, the exclusive range is surrounded by the bold line among the transition routes in FIG. 24, which were generated by expanding the operational process illustrated in FIG. 7. The exclusive range encompasses the server A as the operation target. The exclusive range for all of the transition routes starts from the activity whose activity number is A1. Then, as for the first, second, third, fourth, fifth, seventh and eighth transition routes, the activity next to the activity for which there is no operation target is the end terminal E. Therefore, the exclusive range ends before the activity for which there is no operation target. As for the sixth and ninth transition routes, the exclusive range ends before the end terminal E.

Because any of the transition routes includes the activity using a component whose component attribute is the exclusive type, the route-based determination result becomes the exclusive mode. Therefore, before the execution of the activity whose activity number is A1, the exclusive mode is set as the exclusion method for the server A to obtain the exclusive access right. Moreover, because it is set as the attribute of the server A that the authorization is necessary as illustrated in FIG. 6, the authorization request is sent to the user A who is a manager for the server A before the activity whose activity number is A1 is executed, and when the response represents grant of the execution, a series of activities in the operational process is executed. Then, after the activity at the end of the exclusive range is executed, the exclusive access right is released.

Embodiment 2

In the aforementioned example, the device of the operation target is set at a stage where the operational process is generated. However, the device of the operation target may be set at a stage where the operational process is executed. In the following, an example will be explained in which the device of the operation target is set at the stage where the operational process is executed.

Figure 51:
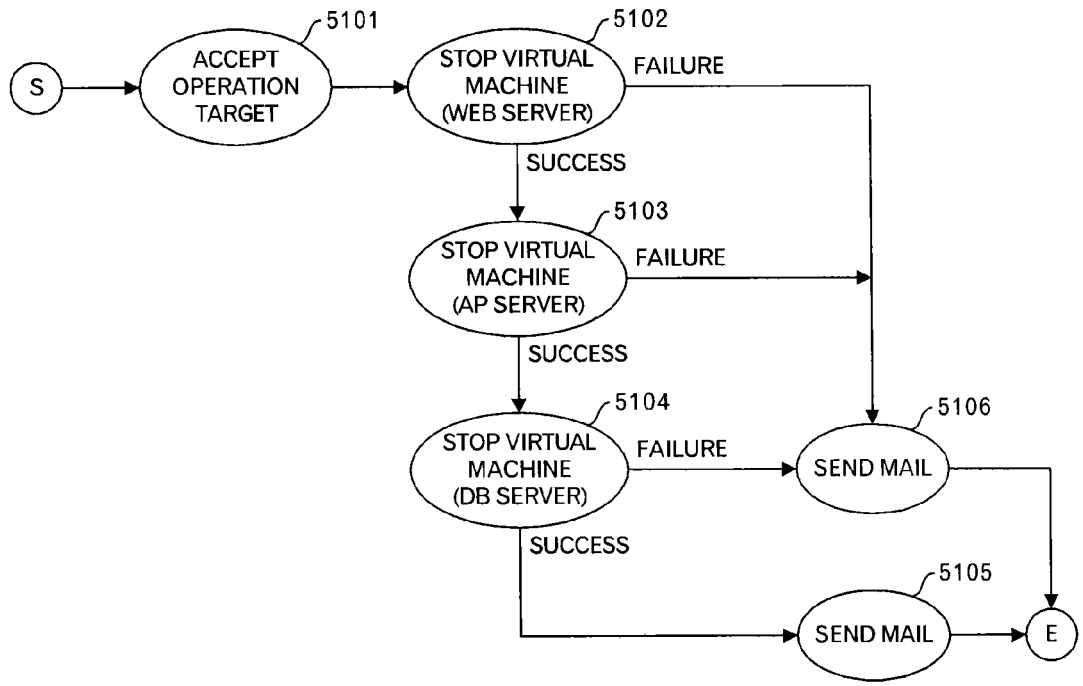
FIG. 51 is a diagram depicting an example of the operational process relating to a second embodiment.

FIG. 51 illustrates an example of an operational process relating to the second embodiment. FIG. 51 illustrates activities 5101 to 5106. The arrows and transition conditions are illustrated as described in the aforementioned examples. However, a Web server is an operation target for the activity 5102, however, no specific device is set. The Web server is a variable for setting the specific device. An AP server is an operation target for the activity 5103, however, no specific device is set. The AP server is a variable for setting the specific device. ADB server is an operation target for the activity 5104, however, no specific device is set. The DB server is a variable for setting the specific device.

The activity 5101 is configured to perform a processing to set the specific devices as the Web server, AP server and DB server as the variables. Therefore, when executed, the activity 5101 displays a window to accept inputs of the specific devices for the Web server, AP server and DB server.

Figure 52:
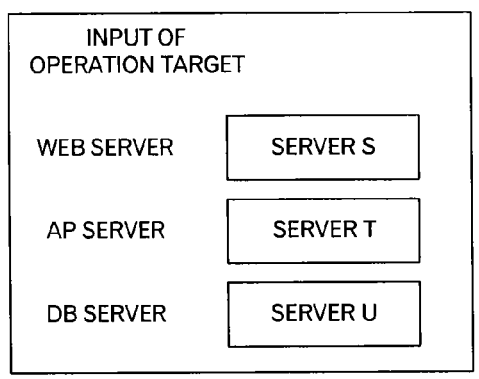
FIG. 52 is a diagram depicting an example of a window to accept the operation target.

FIG. 52 illustrates an example of the window to accept inputs of the operation targets. This window is displayed on a terminal of an operator, which is connected to the process execution server 303, and the operator inputs device names for the Web server, AP server and DB server. Or, this window may be displayed on the display device of the process registration terminal 301, and the designer may input the device names for the Web server, AP server and DB server.

The activity 5101 may extracts types of operation targets of components used for the activities for which the device name is to be set, from the component table 405, extracts the devices suitable for the types of the operation targets from the operation target table 403, displays a menu to display candidates including names of the extracted device, and prompts the user to select any device names.

In an example of FIG. 52, a server whose device name is server S is set for the Web server that is the variable, a server whose device name is server T is set for the AP server that is the variable, and a server whose device name is server U is set for the DB server that is the variable. The server names are written into the process definition 2207.

FIG. 53 illustrates an example of the process definition 2207. Server S is set in the column of the operation target in the record for the activity number A2 for the activity 5102. Server T is set in the column of the operation target in the record for the activity number A3 for the activity 5103. Server U is set in the column of the operation target in the record for the activity number A4 for the activity 5104.

Operations after the operation targets were set in the process definition 2207 by the activity 5101 are the same as the aforementioned example.

FIG. 54 illustrates transition routes obtained by expanding the process definition 2207 in FIG. 53. Moreover, FIG. 55 illustrates the exclusive range for each transition route in FIG. 54. The activities that operate the server S, activities that operate the server T and activities that operate the server U respectively correspond to a single exclusive range. Thus, when the device of the operation target is set at the execution stage of the operational process, it becomes possible to flexibly use the operational process depending on circumstances.

Although the embodiments of this invention were explained, this invention is not limited to those embodiments. For example, the aforementioned functional block configuration does not always correspond to a program module configuration.

Moreover, the aforementioned data storage modes are mere examples, and other data storage modes may be employed. Furthermore, as long as the processing result does not change, an order of steps may be changed. Furthermore, steps may be executed in parallel.

In addition, the aforementioned process registration terminal 301, process execution server 303 and manager terminal 307 are computer devices as illustrated in FIG. 56. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 56. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

A process execution method relating to the embodiments includes: (A) identifying an activity to be executed, based on process definition that includes plural activities, each of which includes information representing a device that is operated through a network, and that includes turns of transitions between activities; (B) first determining, based on the turns of the transitions, whether or not the identified activity initially operates a certain device whose information is included in the identified activity; and (C) upon determining that the identified activity initially operates the certain device, obtaining an access right to the certain device.

By executing such a processing, before the operation is executed for a device of the operation target, the access right is obtained. Therefore, an interrupt based on other process definition is excluded after the initial operation to the device. Especially, when the activity to be executed initially operates the device, an access right is obtained for the device. Therefore, it is possible to automatically obtain the access right at an appropriate timing without embedding any special instruction into the process definition.

Moreover, each of the plural activities may include information representing a component that is a program to process an operation to a device. In such a case, the process execution method may further include: (D) second determining whether an exclusive mode or a shared mode is set for the access right, based on one or plural attributes of one or plural components for one or plural activities included in an exclusive range from the obtaining to releasing the access right. Furthermore, the obtaining may be executed according to a mode determined in the second determining.

Because the exclusion method is set based on attributes of components that are programs, each of which executes the operation to the device, the exclusive mode or shared mode is automatically selected. Especially, it is possible to select the exclusion method according to the property of the operation to the device. Furthermore, because the exclusion method is selected for one or plural activities, which are included in the exclusive range, it is possible to select the exclusion method according to a series of operations within the exclusive range.

Moreover, the second determining may include setting the exclusive range up to an activity immediately before an activity that operates another device other than the certain device or an activity immediately before an end terminal in the process definition.

According to such a processing, on assumption of the appropriate timing to release the access right, it is possible to appropriately determine the exclusive mode or shared mode. Thus, it becomes possible to prevent from any trouble due to a setting mistake regarding the exclusion method.

In addition, each of the one or plural attributes of the one or plural components may represent that an operation executed by the component is an exclusive type or a shared type. In such a case, the second determining may include: determining the exclusive mode is set upon detecting that one attribute of the one or plural attributes of the one or plural components represents the exclusive type; and determining the shared mode is set upon detecting that one attribute of the one or plural attributes of the one or plural components represents the shared type and no attribute of the one or plural attributes of the one or plural components represents the exclusive type.

Thus, it is possible to prevent from interrupting the exclusive range including the operation to be protected, and securely execute the operation to be protected. On the other hand, any operation within the exclusive range including no operation to be protected does not prevent from executing any operation by other process definition.

Furthermore, the process execution method may further include expanding the process definition including a transition with a branch to plural transition routes. In such a case, the second determining may include determining, for each of the plural transition routes, whether a transition route is in the exclusive mode or in the shared mode, and the obtaining may include: upon detecting that any one transition route of the plural transition routes is in the exclusive mode, setting the exclusive mode for the access right; and upon detecting that anyone transition route of the plural transition routes is in the shared mode and no transition route of the plural transition routes is in the exclusive mode, setting the shared mode for the access right.

According to this processing, when a transition with a branch is included in the process definition, the respective transition routes are considered to securely set the exclusion method.

Furthermore, each of the plural activities may include information representing a component that is a program to process an operation to a device. In such a case, the process execution method may further include: executing a program that is a component for the identified activity, and upon detecting that a device for a next activity to the identified activity is different from the certain device, or upon detecting that there is no next activity to the identified activity, releasing the access right.

Thus, it is possible to automatically release the access right without embedding any special instruction into the process definition. Specifically, it is possible to release the access right for the device that is no longer operated at an appropriate timing.

Furthermore, the process execution method may further include: third determining whether or not authorization by a manager is required, based on an attribute of a device for the identified activity.

According to this processing, it is possible to determine the necessity of the authorization by the manager according to the property of the device. Therefore, there is no need for the designer to determine the necessity of the authorization for each activity, and embed the instructions of the authorization into the process definition.

In addition, the third determining may include: upon detecting that an exclusive mode is set for the access right, determining whether or not the authorization by the manager is required.

Thus, it is possible to automatically set a chance to consider an influence of the exclusion for the manager.

Furthermore, the third determining further may include: upon determining the authorization by the manager is required, transmitting an authorization request to a terminal of the manager; and upon receiving a response representing denial, determining that execution of the identified activity is not allowed.

Thus, it is possible to terminate the execution of the activity by reflecting the determination by the manager.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:
   expanding, to plural transition routes, a process definition that includes a plurality of activities, a sequence of transitions between activities and a transition with a branch, wherein each of the plurality of activities includes information representing a device that is operated through a network and information representing a component that is a program to process an operation to the device;
   specifying an activity to be executed, based on the process definition;
   first determining, based on the sequence of the transitions, whether a certain device on which the specified activity is to be executed is a device whose information is included in the specified activity and which is different from a device on which activities before the specified activity have already been executed;
   upon determining that the certain device is the device whose information is included in the specified activity and which is different from the device on which the activities before the specified activity have already been executed, second determining, for each of the plural transition routes and based on one or plural attributes of one or plural components for one or plural activities included in an exclusive range from obtaining to releasing an access right to the certain device, whether the transition route is in an exclusive mode or a shared mode;
   upon detecting that any one transition route of the plural transition routes is in the exclusive mode, setting the exclusive mode for the access right;
   upon detecting that any one transition route of the plural transition routes is in the shared mode and no transition route of the plural transition routes is in the exclusive mode, setting the shared mode for the access right; and obtaining the access right.

2. The computer-readable, non-transitory storage medium as set forth in claim 1, wherein the second determining comprises setting the exclusive range up to an activity immediately before an activity that operates another device other than the certain device or an activity immediately before an end terminal in the process definition.

3. The computer-readable, non-transitory storage medium as set forth in claim 1, wherein the process further comprises:
   executing a program that is a component for the specified activity, and
   upon detecting that a device for a next activity to the specified activity is different from the certain device, or upon detecting that there is no next activity to the specified activity, releasing the access right.

4. The computer-readable, non-transitory storage medium as set forth in claim 1, wherein the process further comprises: third determining whether or not authorization by a manager is required, based on an attribute of a device for the specified activity.

5. The computer-readable, non-transitory storage medium as set forth in claim 4, wherein the third determining comprises, upon detecting that the exclusive mode is set for the access right, determining whether or not the authorization by the manager is required.

6. The computer-readable, non-transitory storage medium as set forth in claim 5, wherein the third determining further comprises:
   upon determining the authorization by the manager is required, transmitting an authorization request to a terminal of the manager; and
   upon receiving a response representing denial, determining that execution of the specified activity is not allowed.

7. A process execution method, comprising:
   expanding, by using a computer and to plural transition routes, a process definition that includes a plurality of activities, a sequence of transitions between activities and a transition with a branch, wherein each of the plurality of activities includes information representing a device that is operated through a network and information representing a component that is a program to process an operation to the device;

specifying, by using the computer, an activity to be executed, based on the process definition;

first determining, by using the computer, based on the sequence of the transitions, whether a certain device on which the specified activity is to be executed is a device whose information is included in the specified activity and which is different from a device on which activities before the specified activity have already been executed;

upon determining that the certain device is the device whose information is included in the specified activity and which is different from the device on which the activities before the specified activity have already been executed, second determining, by using the computer, for each of the plural transition routes and based on one or plural attributes of one or plural components for one or plural activities included in an exclusive range from obtaining to releasing an access right to the certain device, whether the transition route is in an exclusive mode or a shared mode;

upon detecting that any one transition route of the plural transition routes is in the exclusive mode, setting, by using the computer, the exclusive mode for the access right;

upon detecting that any one transition route of the plural transition routes is in the shared mode and no transition route of the plural transition routes is in the exclusive mode, setting, by using the computer, the shared mode for the access right; and obtaining, by using the computer, the access right.

8. An information processing apparatus, comprising:

a memory; and a processor using the memory and configured to execute a process, the process comprising:

expanding, to plural transition routes, a process definition that includes a plurality of activities, a sequence of transitions between activities and a transition with a branch, wherein each of the plurality of activities includes information representing a device that is operated through a network and information representing a component that is a program to process an operation to the device;

specifying an activity to be executed, based on the process definition;

first determining, based on the sequence of the transitions, whether a certain device on which the specified activity is to be executed is a device whose information is included in the specified activity and which is different from a device on which activities before the specified activity have already been executed;

upon determining that the certain device is the device whose information is included in the specified activity and which is different from the device on which the activities before the specified activity have already been executed, second determining, for each of the plural transition routes and based on one or plural attributes of one or plural components for one or plural activities included in an exclusive range from obtaining to releasing an access right to the certain device, whether the transition route is in an exclusive mode or a shared mode;

upon detecting that any one transition route of the plural transition routes is in the exclusive mode, setting the exclusive mode for the access right;

upon detecting that any one transition route of the plural transition routes is in the shared mode and no transition route of the plural transition routes is in the exclusive mode, setting the shared mode for the access right; and obtaining the access right.

\* \* \* \* \*